United States Patent [19]

Inazawa et al.

[11] Patent Number: 5,781,369
[45] Date of Patent: Jul. 14, 1998

[54] MAGNETIC TAPE APPARATUS WITH AN AUXILIARY ENTRY/EXIT MECHANISM

[75] Inventors: Katsumi Inazawa; Kengo Yamakawa; Hiroyuki Sugihara, all of Kawasaki, Japan

[73] Assignee: Fujitsu Limited, Kawasaki, Japan

[21] Appl. No.: 807,346

[22] Filed: Feb. 28, 1997

Related U.S. Application Data

[63] Continuation of Ser. No. 283,275, Jul. 29, 1994, abandoned.

[30] Foreign Application Priority Data

Nov. 10, 1993 [JP] Japan ............................ 5-280941

[51] Int. Cl.⁶ .......................... G11B 15/68; G11B 17/22
[52] U.S. Cl. ..................... 360/92; 360/69; 360/96.5; 360/98.04; 369/34; 369/36
[58] Field of Search ............................ 360/92, 69, 71, 360/96.5, 98.04–98.06, 137; 369/34, 36

[56] References Cited

U.S. PATENT DOCUMENTS

| 4,802,035 | 1/1989 | Ohtsuka | 360/92 |
|---|---|---|---|
| 4,878,137 | 10/1989 | Yamashita et al. | 369/36 |
| 4,903,152 | 2/1990 | Matsui | 360/92 |
| 4,912,575 | 3/1990 | Shiosaki | 360/92 |
| 4,918,549 | 4/1990 | Katono et al. | 360/96.5 |
| 4,933,790 | 6/1990 | Mitumaru | 360/96.5 |
| 5,264,973 | 11/1993 | Seo et al. | 360/137 |
| 5,353,269 | 10/1994 | Kobayashi et al. | 369/34 |
| 5,502,697 | 3/1996 | Taki | 369/34 |

FOREIGN PATENT DOCUMENTS

| 0334257 | 9/1989 | European Pat. Off. | 360/92 |
|---|---|---|---|
| 0392620 | 10/1990 | European Pat. Off. | 360/92 |
| 3925902 | 3/1990 | Germany | 369/34 |
| 63-046655 | 2/1988 | Japan | 369/34 |
| 02-096617 | 1/1991 | Japan | . |
| 04-010265 | 1/1992 | Japan | 360/92 |

*Primary Examiner*—Craig A. Renner
*Attorney, Agent, or Firm*—Greer, Burns & Crain, Ltd.

[57] ABSTRACT

A magnetic tape apparatus has an automatic loading mechanism for automatically loading a cartridge containing a recording medium. The magnetic tape apparatus includes, in addition to the automatic loading mechanism, a recording/reproducing unit, a magazine for storing a plurality of cartridges, an accessor for feeding a cartridge, a charger/discharger for charging and discharging a cartridge other than the cartridges stored in the magazine, and a positioning unit for positioning a charged cartridge in a normal position. The magnetic tape apparatus is capable of carrying out special processes including an interrupting process.

23 Claims, 23 Drawing Sheets

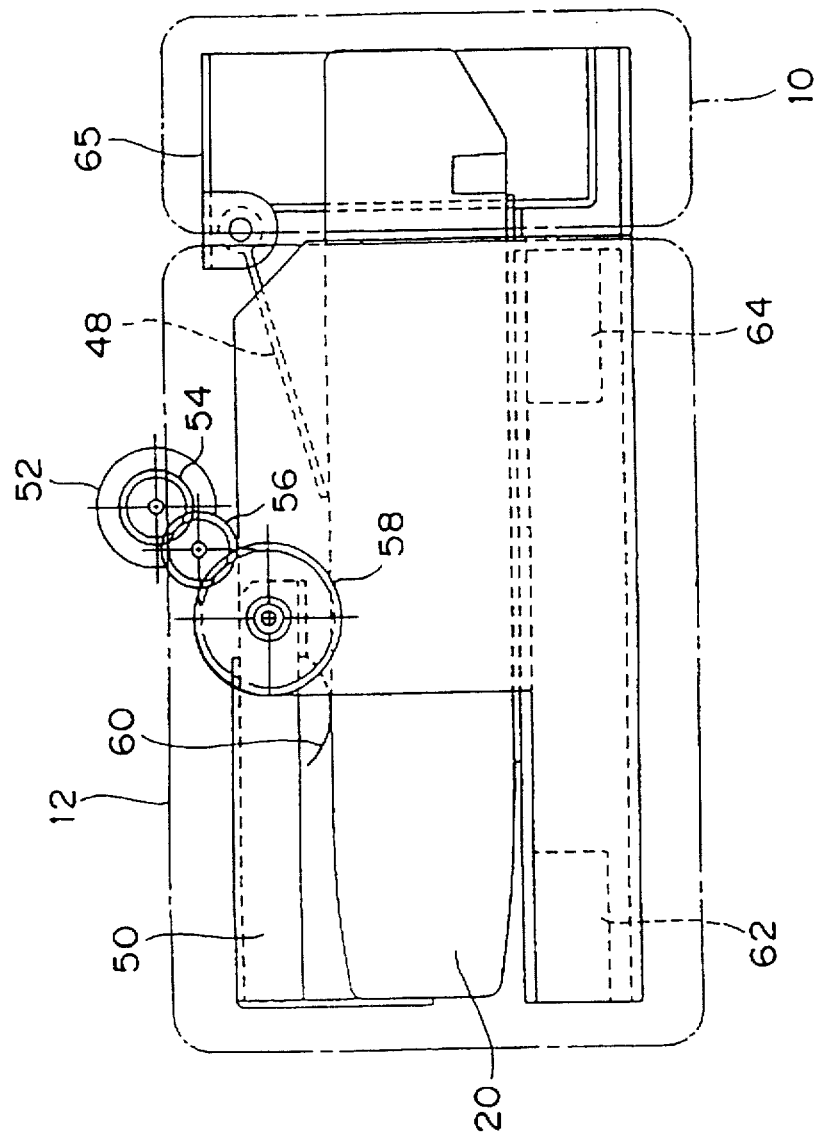

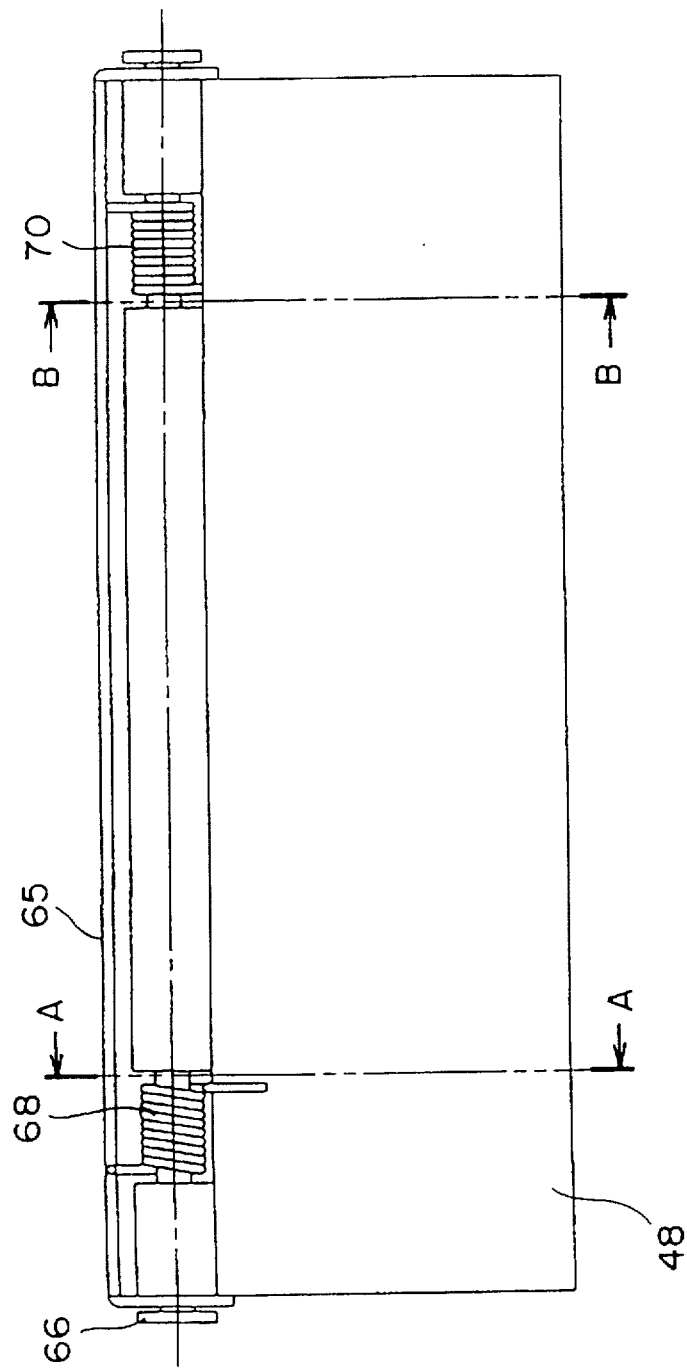

| Sensor Output | #1 | #2 | #3 | #4 | #5 | #6 | #7 | #8 | #9 | #10 |
|---|---|---|---|---|---|---|---|---|---|---|
| HI | | | | | | | | | | |
| LO | — | — | — | — | — | — | — | — | — | — |

FIG. 19

| Sensor Output | | #1 | #2 | #3 | #4 | #5 | #6 | #7 | #8 | #9 | #10 |
|---|---|---|---|---|---|---|---|---|---|---|---|
| | HI | — | — | — | — | — | — | — | — | — | — |
| | LO | — | — | — | — | — | — | — | — | — | — |

MAGNETIC TAPE APPARATUS WITH AN AUXILIARY ENTRY/EXIT MECHANISM

This application is a continuation of application Ser. No. 08/283,275 filed on Jul. 29, 1994, now abandoned.

BACKGROUND OF THE INVENTION

1. Field of the Invention

The present invention relates to a magnetic tape apparatus having an automatic loading mechanism for automatically loading a cartridge-type recording medium.

2. Description of the Related Art

In recent years, there has been a demand for an increase in the storage capacity of a recording medium as the performance of computers increases. For example, a recording and reproducing apparatus such as a magnetic tape apparatus, an optical disk apparatus, or the like is desired to be able to process successively a plurality of compatible mediums such as magnetic tape cartridges, optical disk cartridges, or the like for thereby increasing the storage capacity, reducing the intervention of the operator, and lowering the operating cost.

Automatic loading mechanisms for automatically loading a cartridge-type recording medium (hereinafter referred to simply as a "cartridge") include a stacker-type mechanism for stacking cartridges in a stacker and loading the lowermost one of the stacked cartridges into a recording/ reproducing device, and a magazine-type mechanism including a portable magazine for housing a plurality of cartridges. A known magnetic tape apparatus having an automatic loading mechanism of the magazine type comprises a recording/reproducing unit for recording data on and reproducing data from a cartridge, a magazine having a plurality of bins for storing respective cartridges, and an accessor movable between the recording/reproducing unit and the magazine along the array of bins for transferring a cartridge between the recording/reproducing unit and the magazine.

The known magazine-type automatic loading mechanism is advantageous in that since cartridges can be handled magazine by magazine, the process of replacing cartridges is simplified, the management of cartridges in a magazine is easy, and that one cartridge can be processed many times without the intervention of the operator. However, it is impossible to effect an interrupting process for replacing some of the cartridges as is the case with the stacker-type automatic loading mechanism in which some of the stacked cartridges can be replaced.

SUMMARY OF THE INVENTION

It is therefore an object of the present invention to provide a magnetic tape apparatus having an automatic loading mechanism with a magazine, the magnetic tape apparatus being capable of easily carrying out special processes such as an interrupting process.

According to the present invention, there is provided a magnetic tape apparatus comprising an automatic loading mechanism for automatically loading a cartridge-type recording medium, a recording/reproducing unit disposed behind the automatic loading mechanism for recording data on and reproducing data from the cartridge-type recording medium, a magazine detachably disposed in front of the automatic loading mechanism and having an array of bins for storing cartridge-type recording mediums, respectively, an accessor movable along the array of bins between the recording/reproducing unit and the magazine for transferring a cartridge-type recording medium between the recording/reproducing unit and the magazine, an auxiliary entry/exit mechanism disposed within the automatic loading mechanism for permitting the entry and exit of a cartridge-type recording medium other than the cartridge-type recording mediums stored in the magazine, and positioning means for positioning a cartridge-type recording medium loaded into the auxiliary entry/exit mechanism in a first position in which the cartridge-type recording medium can be received by the accessor, and positioning a cartridge-type recording medium returned to the auxiliary entry/exit mechanism by the accessor in a second position in which the cartridge-type recording medium can be picked up by an operator, the accessor comprising means for transferring a cartridge-type recording medium between the auxiliary entry/exit mechanism and the recording/reproducing unit.

Preferably, the accessor transfers a cartridge-type recording medium between the auxiliary entry/exit mechanism and the magazine.

The magnetic tape apparatus has the auxiliary entry/exit mechanism for permitting the entry and exit of a cartridge-type recording medium other than the cartridge-type recording mediums stored in the magazine, and the positioning means for positioning a cartridge-type recording medium entered into the auxiliary entry/exit mechanism in the first position in which the cartridge-type recording medium can be received by the accessor, and positioning a cartridge-type recording medium returned to the auxiliary entry/exit mechanism by the accessor in the second position in which the cartridge-type recording medium can be picked up by an operator, and the accessor transfers a cartridge-type recording medium between the auxiliary entry/exit mechanism and the recording/reproducing unit. With this arrangement, even when the magazine is set in place in the apparatus, an interrupting process for inserting or removing a cartridge can easily be carried out.

The above and other objects, features, and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 6 is a side elevational view of an auxiliary entry/exit mechanism and a positioning means;

FIG. 7 is a front elevational view of a door shown in FIG. 6;

FIG. 17 is a diagram showing detected output signals from a cartridge sensor;

FIG. 19 is a diagram showing detected output signals from a cartridge sensor;

DETAILED DESCRIPTION OF THE PREFERRED EMBODIMENTS

Figure 1:
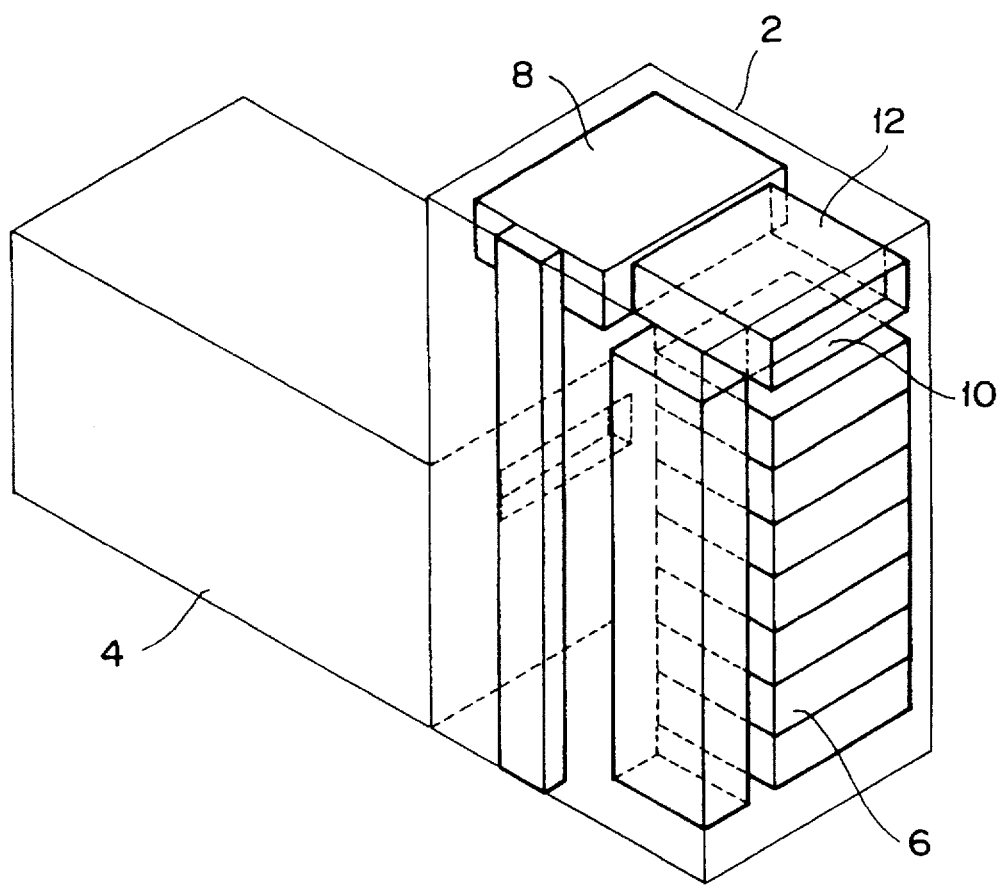
FIG. 1 is a perspective view showing a basic structure of a magnetic tape apparatus according to the present invention.

As shown in FIG. 1, a magnetic tape apparatus according to the present invention has an automatic loading mechanism 2 for automatically loading cartridges. The magnetic tape apparatus also has a recording/reproducing unit 4 disposed behind the automatic loading mechanism 2 for recording data on and reproducing data from a cartridge. The automatic loading mechanism 2 houses a removable magazine 6 in its front region, the magazine 6 having a plurality of bins for storing respective cartridges therein. An accessor 8 is movable between the recording/reproducing unit 4 and the magazine 6 along the array of bins in the magazine 6 for transferring a cartridge between the recording/reproducing unit 4 and the magazine 6.

The automatic loading mechanism 2 also accommodates a auxiliary entry/exit mechanism 10 in its front region for entering and discharging a cartridge other than the cartridges housed in the magazine 6. A positioning means 12 serves to position a cartridge charged into the auxiliary entry/exit mechanism 10 in a first position wherein the cartridge can be received by the accessor 8, i.e., in a rear position in the automatic loading mechanism 2, and in a second position wherein the cartridge returned to the auxiliary entry/exit mechanism 10 by the accessor 8 can be picked up by the operator, i.e., in a front position in the automatic loading mechanism 2. The accessor 8 also serves to transfer a cartridge between the auxiliary entry/exit mechanism 10 and the recording/reproducing unit 4.

With this arrangement, despite the use of the magazine 6, the magnetic tape apparatus can carry out special processes as is the case with a stacker-type automatic loading mechanism. The special processes include (1) an interrupting process, (2) a single medium process, and (3) a medium removal process. These processes will briefly be described below.

(1) The interrupting process: While the magazine 6 with cartridges housed therein is being set in place, a cartridge other than the cartridges housed in the magazine 6 is introduced from the auxiliary entry/exit mechanism 10 into the recording/reproducing unit 4, in which data are recorded on or reproduced from the cartridge.

(2) The single medium process: With no magazine 6 set in place, only a desired cartridge is introduced from the auxiliary entry/exit mechanism 10 into the recording/reproducing unit 4, in which data are recorded on or reproduced from the cartridge.

(3) The cartridge removal process: This process is also referred to as a Dynamic Device Reconfiguration (DDR) process. When some error occurs while a cartridge is being processed by the recording/reproducing unit 4, the cartridge is set again in the recording/reproducing unit of another magnetic tape apparatus and processed again. In a conventional magnetic tape apparatus with a magazine, it has been necessary to remove the magazine and take out a cartridge which has caused an error. With the arrangement shown in FIG. 1, however, a cartridge which has caused an error can be introduced from the recording/reproducing unit 4 directly into the auxiliary entry/exit mechanism 10 by the accessor 8.

To carry out the above processes, it is sufficient for the accessor 8 to transfer a cartridge between the magazine 6 and the recording/reproducing unit 4 and also between the auxiliary entry/exit mechanism 10 and the recording/reproducing unit 4. Practically, however, it is preferable for the accessor 8 to be able to transfer a cartridge between the auxiliary entry/exit mechanism 10 and the magazine to meet a demand for discharging any one of the cartridges stored in the magazine 6 directly from the auxiliary entry/exit mechanism 10.

One conventional arrangement relevant to the present invention is a cartridge access device disclosed in Japanese laid-open patent publication No. 3-16059. In the disclosed device, a magazine has a special process port or bin for allowing special processes to be effected therethrough. Specifically, the magazine can store seven cartridges, one of which is stored in the special process port or bin. The six cartridges stored in the other bins are processed normally. To effect a special process, therefore, the number of cartridges which are processed is reduced from the total number of bins available. According to the present invention, however, no such problem arises because a special process bin is provided in addition to the magazine.

Figure 2:
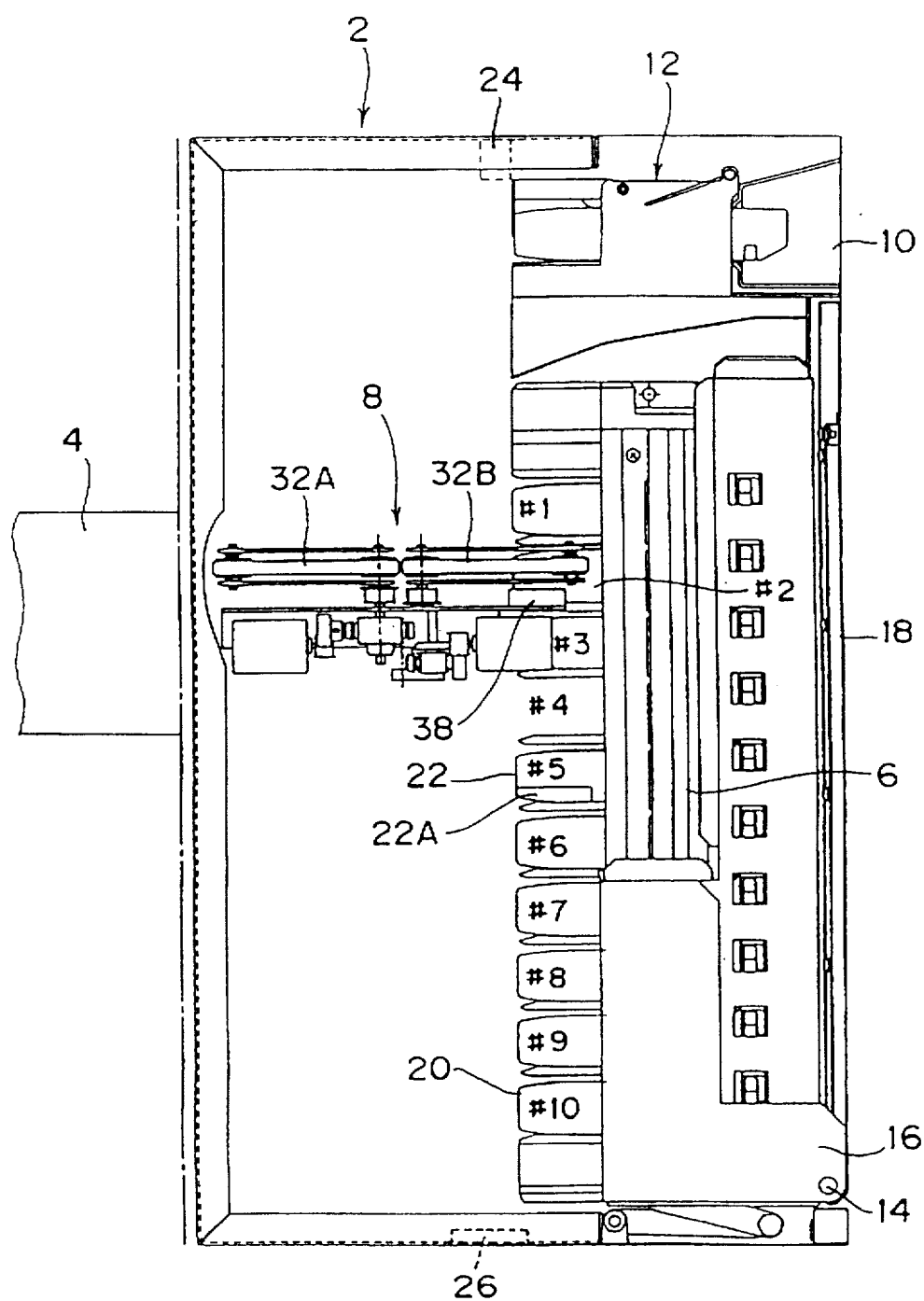
FIG. 2 is a side elevational view of the magnetic tape apparatus with a side cover detached.

As shown in FIG. 2, a magazine table 16 is disposed in the front region of the automatic loading mechanism 2 (on the right-hand side of FIG. 2) for angular movement about a shaft 14. With the magazine table 16 turned clockwise in FIG. 2, the magazine 6 is placed on the magazine table 16. Then, the magazine table 16 is turned counterclockwise as shown in FIG. 2 to set the magazine 6 into the automatic loading mechanism 2. In this embodiment, a door 18 is openable and closably disposed in the front side of the automatic loading mechanism 2 for protecting the magazine 6 which has been set in place. The door 18 is angularly movable about the shaft 14. The magazine 6 has a plurality (ten in the illustrated embodiment) of bins #1–#10 for storing respective cartridges therein. In FIG. 2, a normal recording/reproducing cartridge 20 is stored in the bin #10, and a cleaning cartridge 22 is stored in the bin #5. The cleaning cartridge 22 is used to clean the head in the recording/reproducing unit 4. The cleaning cartridge 22 has a recess 22A (described later on) defined in a side wall thereof.

The cartridges stored in the respective bins tend to jump out of or drop off the bins due to shocks produced when the magazine 6 is set in the automatic loading mechanism 2. The automatic loading mechanism 2 has an optical sensor 24 positioned in an upper portion thereof and a reflecting mirror 26 positioned in a lower portion thereof for detecting any jumping or dropping of a cartridge. The optical sensor 24 includes a light beam emitter for emitting a light beam to the reflecting mirror 26 along the longitudinal axis of the magazine 6 and a light beam detector for detecting a light beam reflected by the reflecting mirror 26.

If a cartridge projects out of the magazine 6, then the light beam emitted from the light beam emitter is blocked by the cartridge, and the interruption of the light beam is detected by the optical sensor 24. Therefore, the projection of the cartridge can be detected. If a cartridge drops off the magazine 6, the light beam is temporarily blocked when the cartridge moves across the light beam. The dropping of the cartridge is detected when the temporary blocking of the light beam is detected by the optical sensor 24.

The arrangement and operation of the accessor 8 will be described below with reference to FIGS. 2 and 3. The accessor 8 is positioned between the recording/reproducing unit 4 and the magazine 6, and movable along the array of bins #1–#10 in the magazine 6, i.e., vertically in FIG. 2. The accessor 8 can be vertically slidable and positioned along a rail 28 by an actuator 30.

The accessor 8 has first and second feeders 32, 34 for feeding a cartridge horizontally (to the left or right in FIG. 3), and a catcher 36 for opening and closing the first and second feeders 32, 34. The first feeder 32, which is positioned on the left-hand side as seen from the front side of the automatic loading mechanism 2 toward the accessor 8, comprises two endless belts 32A, 32B and a means for actuating these endless belts 32A, 32B. The second feeder 34, which is positioned on the right-hand side, comprises two endless belts 34A, 34B and a means for actuating these endless belts 34A, 34B.

When the actuator 8 is to move vertically, the feeders 32, 34 are opened by the catcher 36. When the accessor 8 stops to feed a desired cartridge horizontally, the feeders 32, 34 are closed by the catcher 36. These feeders are held against a side of the cartridge, which is fed horizontally due to frictional forces produced between the feeders and the cartridge and drive forces produced by the feeders.

Cartridge sensors 38, 40 are positioned on the left- and right-hand sides, respectively, of the accessor 8 as seen from the magazine 6. The cartridge sensor 38 detects whether there is a cartridge in the magazine 6 as the accessor 8 moves. The cartridge sensor 38 also detects whether a cartridge stored in the magazine 6 is an ordinary cartridge or a cleaning cartridge. The cartridge sensor 40 detects whether a cartridge is stored in a normal direction in the magazine 6. Detailed functions of the cartridge sensors 38, 40 will be described below.

Figure 4:
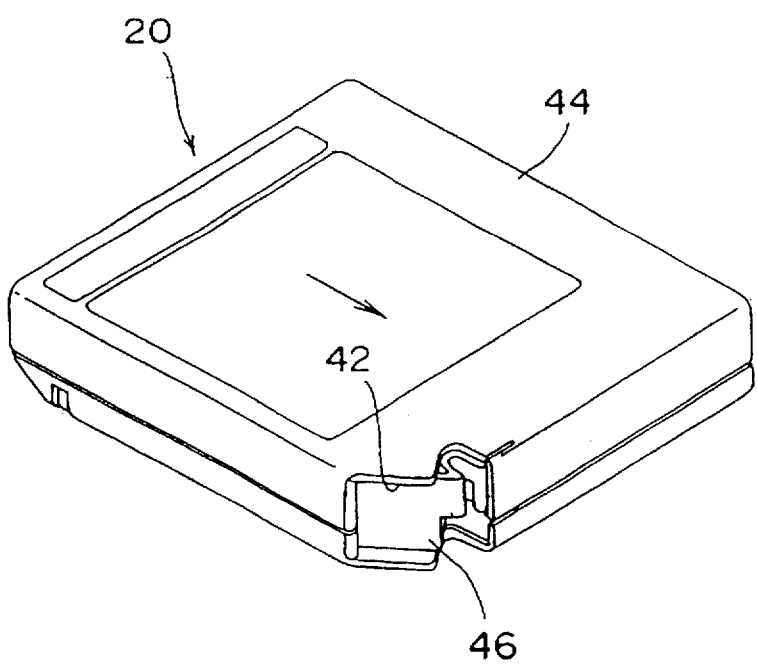
FIG. 4 is a perspective view of a cartridge.

As shown in FIG. 4, an ordinary cartridge 20, i.e., a cartridge for recording and reproducing data comprises a cartridge case 44 substantially in the form of a rectangular parallelepiped having a recess 42 defined in one of its four corners, a magnetic tape (not shown) wound and stored in the cartridge case 44, and a leader block 46 attached to one end of the magnetic tape and seated in the recess 42 when the magnetic tape is wound in the cartridge case 44. An arrow marked on the upper panel of the cartridge case 44 indicates the direction in which the cartridge is to be inserted into the magazine 6.

Since the cartridge has the recess 42 in one of its four corners, any erroneous insertion of the cartridge into the magazine 6 can be detected by determining whether the recess 42 is located in a predetermined position in the magazine 6. Specifically, if the cartridge sensor 40 shown in FIG. 3 is a reflective optical sensor, for example, then when the cartridge 20 is stored in a normal direction in the magazine 6, the cartridge sensor 40 does not respond, but when the cartridge 20 is stored in an inverse direction in the magazine 6, the cartridge sensor 40 responds, thereby detecting the erroneous insertion of the cartridge 20.

Figure 5A:
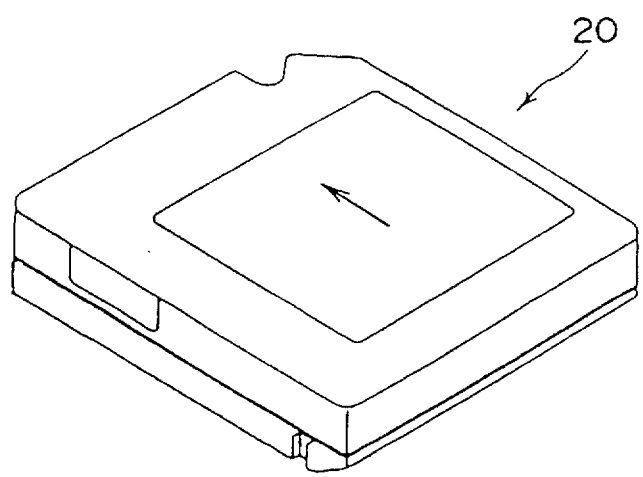
FIGS. 5A and 5B are perspective views of an ordinary cartridge and a cleaning cartridge, respectively.
Figure 5B:
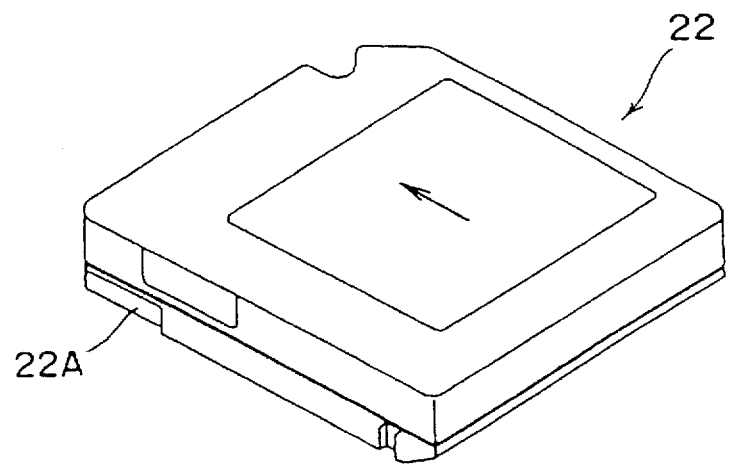

FIG. 5A shows the ordinary cartridge 20 as viewed from its back. FIG. 5B shows the cleaning cartridge 22 also as viewed from its back. The cleaning cartridge 22 has a recess 22A defined in a lower left portion thereof on its front side in the direction in which it is inserted into the magazine 6.

Figure 3:
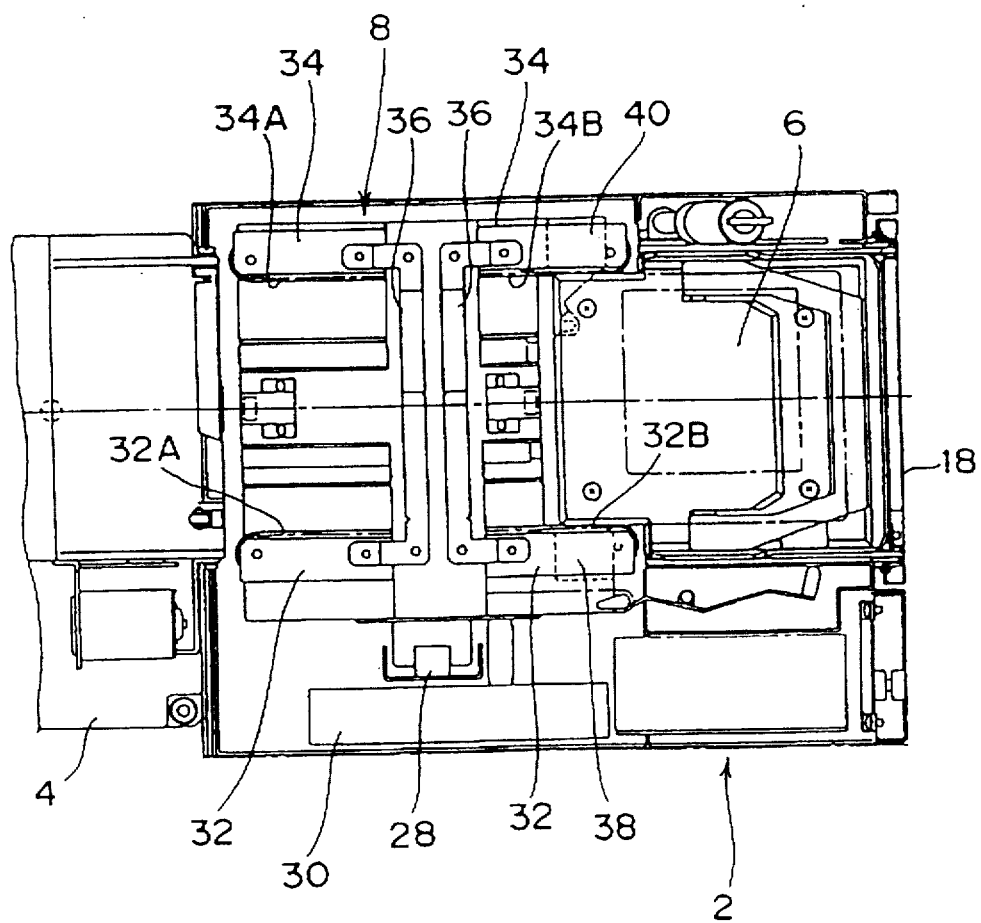
FIG. 3 is a plan view of the magnetic tape apparatus with an upper cover detached.

Inasmuch as the cleaning cartridge 22 has the recess 22A in a portion thereof which is predetermined in the direction of travel of the accessor 8, if the cartridge sensor 38 shown in FIG. 3 comprises a reflective optical sensor, then it can determine whether a cartridge stored in the magazine 6 is the ordinary cartridge 20 or the cleaning cartridge 22. The recess 22A is not defined in the entire portion of the cleaning cartridge 22 in the direction of travel of the accessor 8 in order to enable the cartridge sensor 38 to determine whether a cartridge is stored in the magazine 6 irrespective of whether it is the ordinary cartridge 20 or the cleaning cartridge 22. Detailed processes of detecting whether there is a cartridge in the magazine 6 and whether a stored cartridge is the ordinary cartridge 20 or the cleaning cartridge 22 will be described later on.

The auxiliary entry/exit mechanism 10 and the positioning means 12 (see FIGS. 1 and 2) are shown in FIG. 6. The positioning means 12 serves to position the cartridge 20 charged into the auxiliary entry/exit mechanism 10 in the position (first position) in which the cartridge 20 can be received by the accessor 8 (see FIG. 2), and also to position the cartridge 20 returned to the auxiliary entry/exit mechanism 10 by the accessor 8 in the position (second position) in which the cartridge 20 can be picked up by the operator. The auxiliary entry/exit mechanism 10 has an openable and closable door 48. The positioning means 12 has an openable and closable stopper 50 for holding the cartridge 20 in the first position. The stopper 50 can be actuated by a motor 52. Rotative power from the motor 52 is transmitted through gears 54, 56, 58 to the stopper 50. A leaf spring 60 fixed to the stopper 50 vertically positions the inserted cartridge 20 when the stopper 50 is closed.

The positioning means 12 has a first cartridge position sensor 62 for detecting the cartridge 20 in the first position, and a second cartridge position sensor 64 for detecting the cartridge 20 in the second position. The stopper 50 is controlled based on detected output signals from the first and second cartridge position sensors 62, 64. Each of the first and second cartridge position sensors 62, 64 may comprise a reflective optical sensor, for example.

Figure 8A:
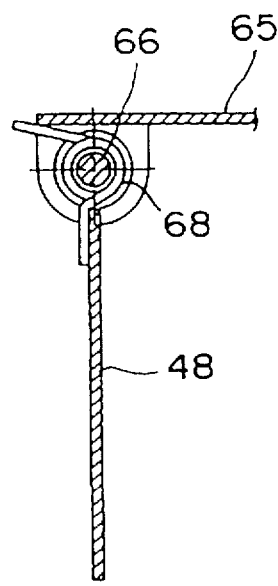
FIGS. 8A and 8B are cross-sectional views taken along lines A—A and B—B, respectively, of FIG. 7.
Figure 8B:
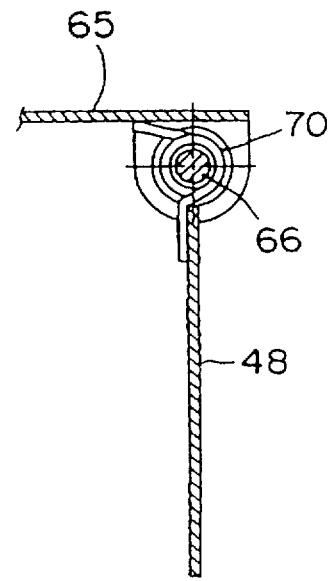

As shown in FIGS. 7 and 8A, 8B, the door 48 is angularly movably mounted on a shaft 66 which is fixed to an apparatus frame 65. Around the shaft 66, there are disposed coil springs 68, 70 having ends fixed to the frame 65 and the door 48 for normally urging the door 48 to be kept in a neutral position, i.e., a closed position shown in FIGS. 8A and 8B. Therefore, when the cartridge 20 is inserted or removed, the door 48 can easily be opened into or out of the apparatus under external forces applied by the cartridge 20. When such external forces are removed, the door 48 returns to its closed neutral position under the bias of the coil springs 68, 70.

Figure 9A:
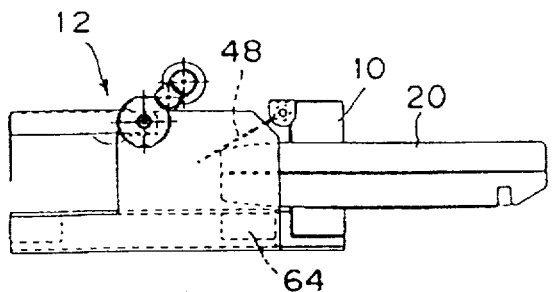
FIGS. 9A through 9E are side elevational views showing the manner in which the mechanism shown in FIG. 6 operates during a cartridge entry.
Figure 9B:
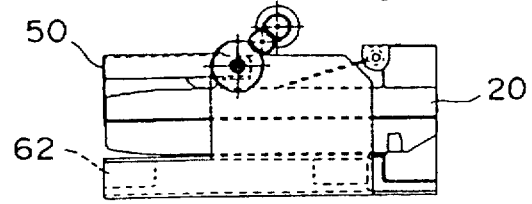
Figure 9C:
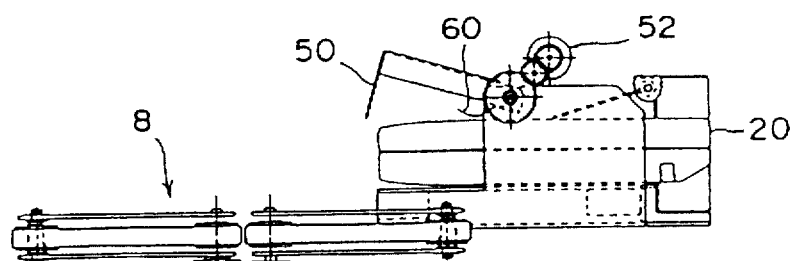

Operation of the mechanism shown in FIG. 6 at the time a cartridge is entered or exited will be described below with reference to FIGS. 9A through 9E and FIGS. 10A through 10E. When a cartridge, e.g., the cartridge 20, other than the cartridges already stored in the magazine 6 (see FIGS. 1 and 2) is to be quickly processed, the operator inserts the cartridge 20 to push open the door 48 as shown in FIG. 9A. At this time, the insertion of the cartridge 20 into the auxiliary entry/exit mechanism 10 is detected by the second cartridge position sensor 64, which sends a signal to a controller (not shown). In response to the signal, the controller starts to move the accessor 8 which has been in any optional position. The operator further pushes in the cartridge 2 until it abuts against the closed stopper 50 as shown in FIG. 9B. The first cartridge sensor 62 now detects that the cartridge 20 is in a transfer position where the cartridge 20 can be transferred to the accessor 8, and sends a signal to the controller. In response to the signal, the controller energizes the motor 52 to open the stopper 50 immediately before the movement of the accessor 8 to the transfer position is completed, as shown in FIG. 9C.

Figure 9D:
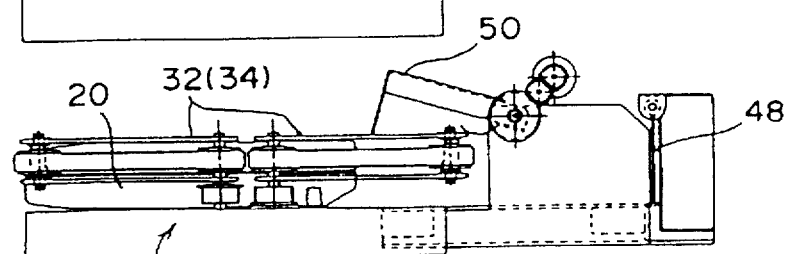

When the stopper 50 is opened, the leaf spring 60 disengages from the upper surface of the cartridge 20, which is released so as to be received by the accessor 8. As shown in FIG. 9D, the feeders 32, 34 of the accessor 8 are actuated to feed the cartridge 20 horizontally, so that the cartridge 20 can then be fed vertically.

Figure 9E:
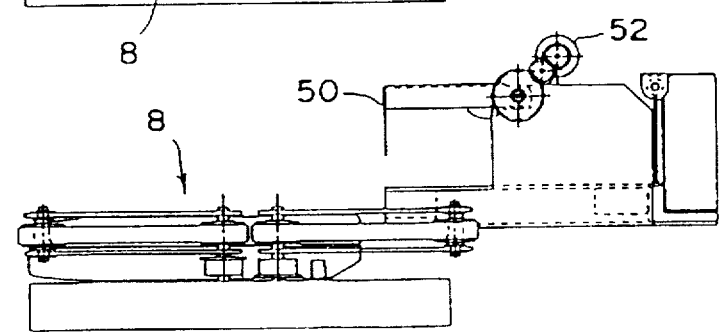

As shown in FIG. 9E, when the cartridge 20 is removed by the accessor 8, the motor 52 is energized to close the stopper 50.

The cartridge 20 is unloaded as shown in FIGS. 10A through 10E. Specifically, when the recording of data on or reproduction of data from the cartridge 20 is finished, the cartridge 20 is discharged from the recording/reproducing unit 4 (see FIGS. 1 and 2). The accessor 8 receives the discharged cartridge 20, and feeds it to the transfer position for transfer to the auxiliary entry/exit mechanism 10.

Figure 10A:
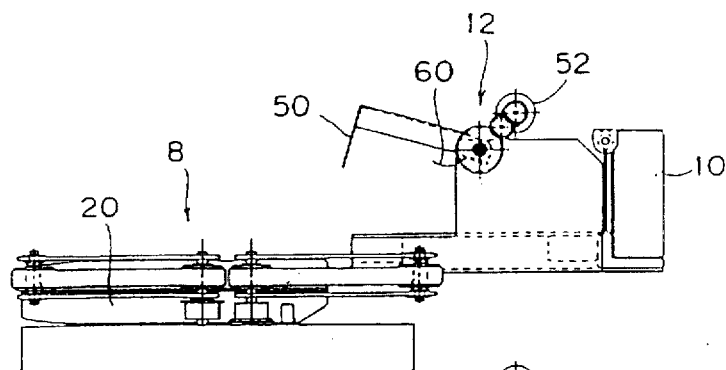
FIGS. 10A through 10E are side elevational views showing the manner in which the mechanism shown in FIG. 6 operates during cartridge exit.
Figure 10B:
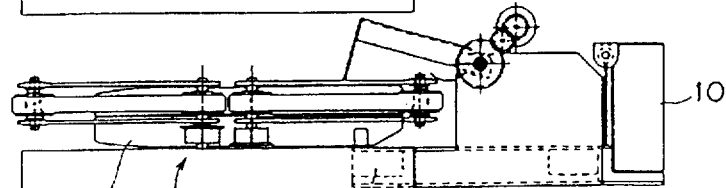

As shown in FIG. 10A, immediately before the accessor 8 reaches the transfer position, the controller energizes the motor 52 to open the stopper 50. Thereafter, as shown in FIG. 10B, upon arrival of the accessor 8 at the transfer position, the accessor 8 discharges the cartridge 20 toward the auxiliary entry/exit mechanism 10. At this time, the first cartridge position sensor 62 detects the cartridge 20 which is moving, and sends a signal to the controller.

Figure 10C:
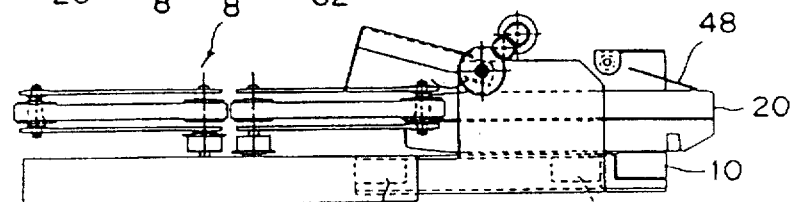

As shown in FIG. 10C, the accessor 8 further transfers the cartridge 20 into the auxiliary entry/exit mechanism 10, and the door 48 opens outwardly as the cartridge 20 moves. The second cartridge position sensor 64 then detects the cartridge 20. The accessor 8 continuously transfers the cartridge 20 until the first cartridge position sensor 62 no longer detects the cartridge 20. When the transfer of the cartridge 20 by the accessor 8 is finished, the controller energizes the motor 52 to close the stopper 50 as shown in FIG. 10D.

Figure 10D:
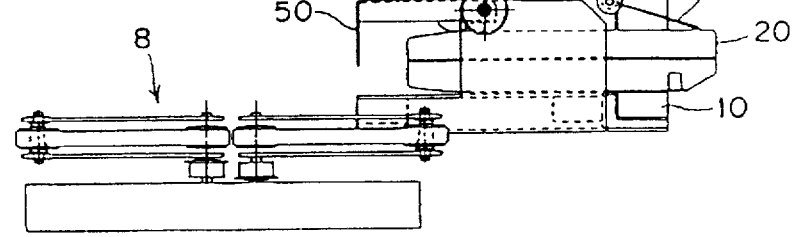
Figure 10E:
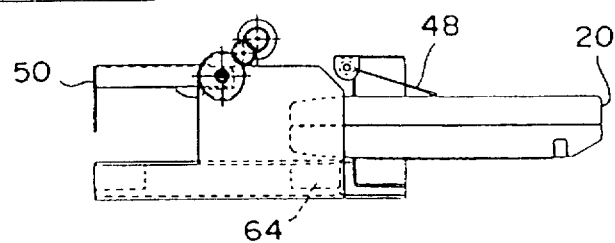

The cartridge 20 pushes out of the auxiliary entry/exit mechanism 10 as shown in FIG. 10D can now easily be taken by the operator. When the cartridge 20 is picked up by the operator, the door 48 is closed under the bias of the coil springs 68, 70 (see FIGS. 7 and 8A, 8B). The discharging process is finished when the cartridge 20 is no longer detected by the second cartridge position sensor 64.

The auxiliary entry/exit mechanism 10 and the positioning means 12 are thus effective to carry out special processes including the interrupting process, the single medium process, and the medium removal process.

The door 48 of the auxiliary entry/exit mechanism 10 can freely be opened and closed before the cartridge 20 is charged, or while the cartridge 20 is being fed by the accessor 8 in the automatic loading mechanism 2 (see FIGS. 1 and 2), or the cartridge 20 is being processed in the recording/reproducing unit 4. Accordingly, another cartridge may be entered into the auxiliary entry/exit mechanism 10 while the cartridge 20 is being fed or processed. If another cartridge is entered into the auxiliary entry/exit mechanism while the cartridge 20 is being fed or processed, the cartridge which has been processed in the recording/reproducing unit 4 cannot be discharged using the auxiliary entry/exit mechanism 10. An improved arrangement to avoid such a drawback will be described below with reference to FIGS. 11 through 13.

Figure 11:
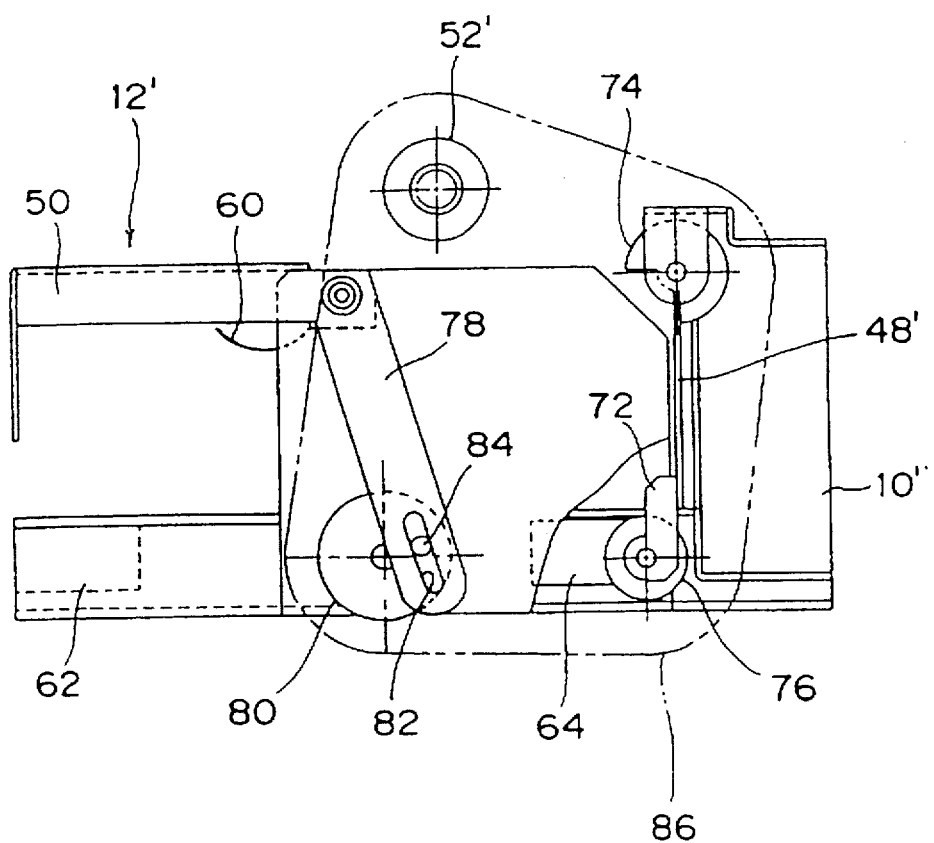
FIG. 11 is a side elevational view of an improved auxiliary entry/exit mechanism and an improved positioning means.

FIG. 11 shows an improved auxiliary entry/exit mechanism 10' and an improved positioning means 12'. Those parts shown in FIG. 11 which are substantially identical to those shown in FIG. 6 are denoted by identical reference numerals. The auxiliary entry/exit mechanism 10' has a door 48' which can be opened only into the apparatus. The door 48' is normally urged to be closed as shown in FIG. 11 by coil springs (not shown). The auxiliary entry/exit mechanism 10' also has a door lock mechanism 72 and a door actuating mechanism 74. The door lock mechanism 72 can be actuated by a drive gear 76. The positioning means 12' has an arm 78 mounted on the stopper 50 for opening and closing the stopper 50, and a rotatable member 80 in the form of a drive gear for actuating the arm 78. The arm 78 has a slit 82 defined in the vicinity of its distal end. A pin 84 slidably engaging in the slit 82 is fixed to the rotatable member 80. The rotational speed of a motor 52' can be varied by a transmission mechanism 86 (indicated by the two-dot-and-dash lines in FIG. 11) into rotational speeds which are required respectively by the door actuating mechanism 74, the drive gear 76, and the drive gear 80. The transmission mechanism 86 comprises a train of gears.

Figure 12:
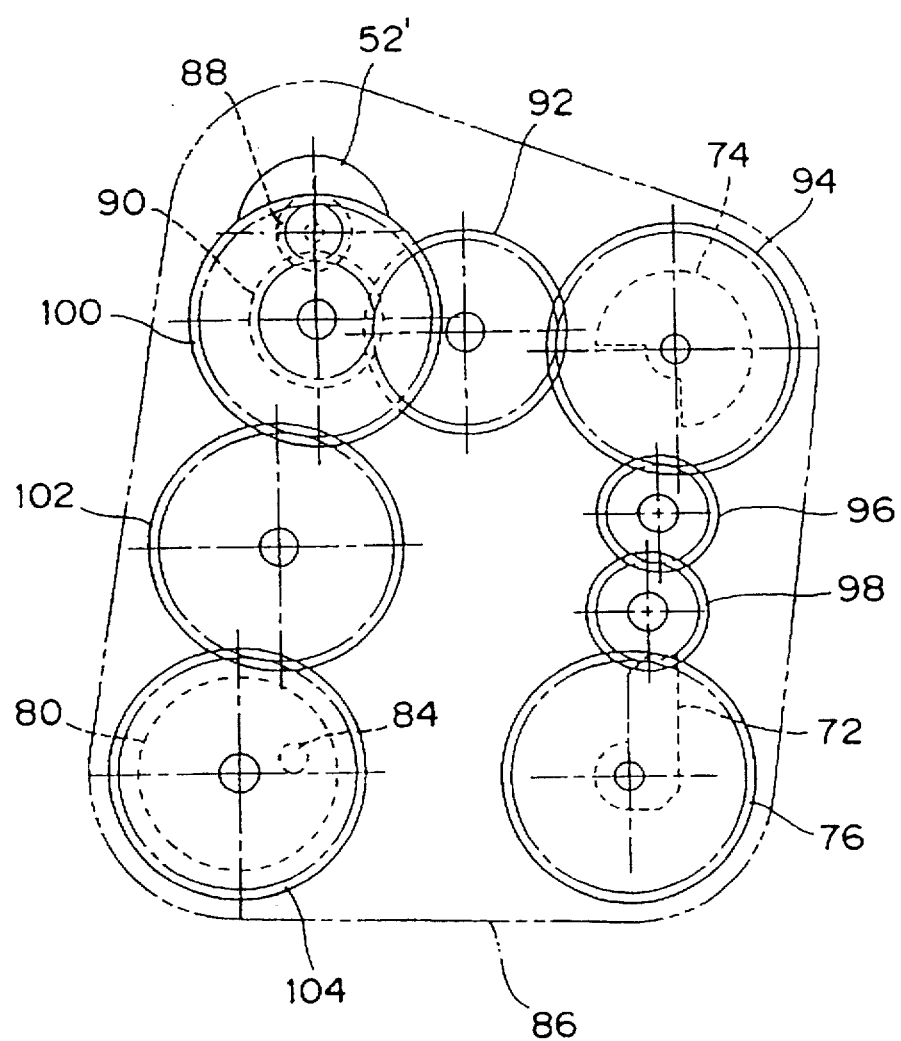
FIG. 12 is a side elevational view of a transmission mechanism shown in FIG. 11.
Figure 13:
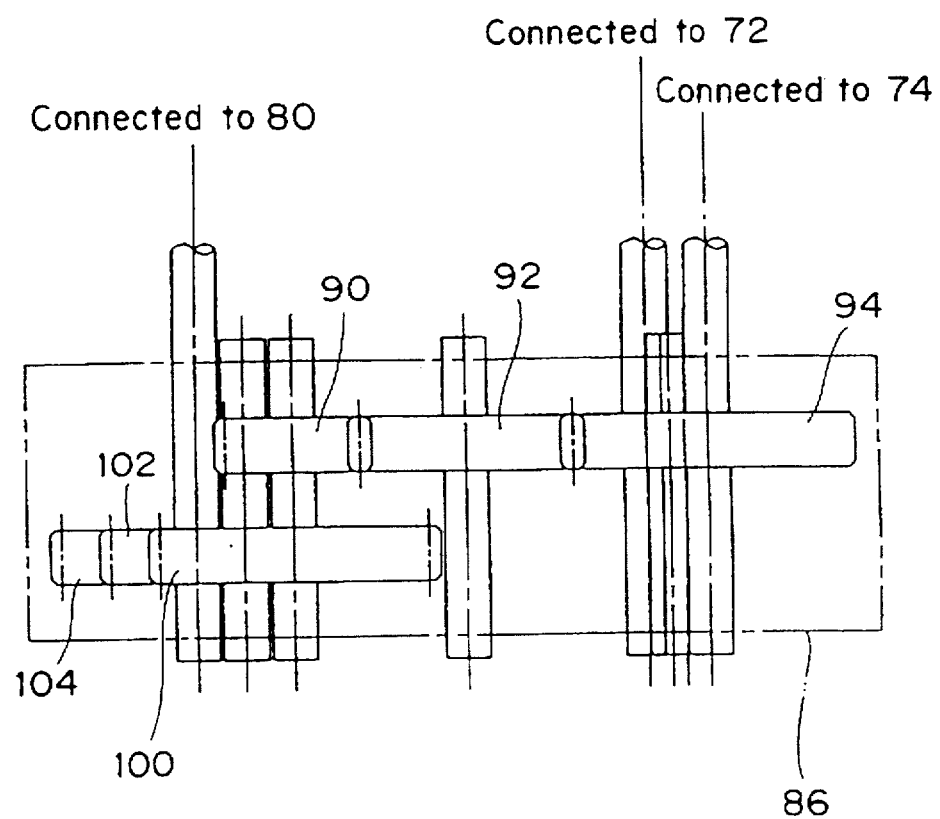
FIG. 13 is a plan view of the transmission mechanism.

FIGS. 12 and 13 show the gear train of the transmission mechanism 86 in detail. The gear train of the transmission mechanism 86 includes a plurality of gears described below. A gear 88 is mounted on the shaft of the motor 52'. Drive power from the motor 52' is transmitted through the gear 88 to a gear 90 and then through a gear 92 to a gear 94 which is coaxial with the door actuating mechanism 74. When the gear 94 is rotated, the door actuating mechanism 74 is actuated. The drive power from the motor 52' is further transmitted through the gear 94 and gears 96, 98 to the drive gear 86, which then actuates the door lock mechanism 72. A gear 100 having a diameter which is twice the diameter of the gear 90 is coupled coaxially to the gear 90. The drive power from the motor 52' is also transmitted through the gear 88 to the gear 90 and hence the gear 100 coaxial therewith. The drive power is further transmitted from the gear 100 through a gear 102 to a gear 104, which rotates the drive gear or rotatable member 80.

The gears 76, 94, 100, 104 have the same number of teeth. The number of teeth of the gear 90 is half the number of teeth of these gears 76, 94, 100, 104. Therefore, the ratio of the rotational speed of the rotatable member 80 to the rotational speed of the door actuating mechanism 74 and the door lock mechanism 72 is 2:1. The transmission mechanism 86 can open and close the door 48', lock the door 48', and open and close the stopper 50 with the single motor 52' in a sequence of operation described below.

Figure 14:
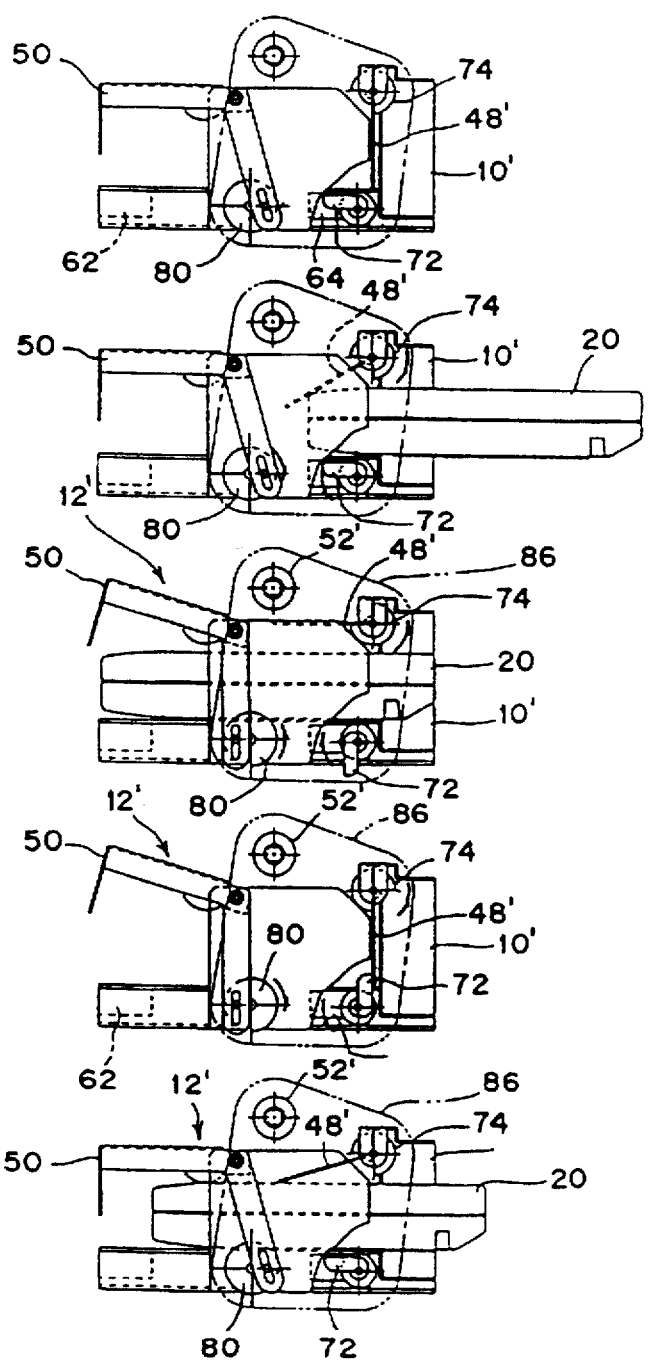
FIGS. 14A through 14E are side elevational views showing the manner in which the mechanism shown in FIG. 11 operates.

FIGS. 14A through 14E show an operation sequence of the mechanism shown in FIG. 11. FIG. 14A illustrates a condition in which no cartridge is loaded into the auxiliary entry/exit mechanism 10'. When a cartridge 20 is entered into the auxiliary entry/exit mechanism 10', the door 48' is pushed open by the leading end of the cartridge 20 as shown in FIG. 14B. When the cartridge 20 is set in a transfer position where it can be received by the accessor (not shown) and the accessor arrives to receive the cartridge 20, the motor 52' is energized, and its drive power is transmitted through the transmission mechanism to the door actuating mechanism 74, the door lock mechanism 72, and the rotatable member 80, whereupon the parts are positioned as shown in FIG. 14C. At this time, the door actuating mechanism 74 and the door lock mechanism 72 have rotated by a quarter of one revolution, and the rotatable member 80 has rotated by a half of one revolution.

When the accessor draws the cartridge 20 out of the auxiliary entry/exit mechanism 10' and the positioning means 12', the motor 52' is energized to rotate the door actuating mechanism 74 and the door lock mechanism 72 by a half of one revolution, and the rotatable member 80 by one revolution, as shown in FIG. 14D, whereupon the door 48' is locked in a closed position by the door lock mechanism 72. When the cartridge 20 which has been recorded or reproduced is transferred by the accessor for return to the auxiliary entry/exit mechanism 10', the motor 52' is energized to rotate the door actuating mechanism 74 and the door lock mechanism 72 by a half of one revolution, and the rotatable member 80 by one revolution to bring the parts back to the position shown in FIG. 14C. At this time, the door 48' is unlocked by the door lock mechanism 72 and open, and the stopper 50 is also open.

Thereafter, when the accessor moves away from the transfer position, the motor 52' is energized to rotate the door actuating mechanism 74 and the door lock mechanism 72 by a quarter of one revolution, and the rotatable member 80 by a half of one revolution, with the parts brought to the position shown in FIG. 14E. In FIG. 14E, since the cartridge 20 projects partly out of the auxiliary entry/exit mechanism 10', the cartridge 20 can easily be picked up by the operator.

The sequence of operation of the various mechanisms shown in FIGS. 14A through 14E is controlled by the controller based on detected output signals from the cartridge position sensors 62, 64. According to this embodiment, the door 48' can be opened and closed, locked, and the stopper 50 can be opened and closed by the single motor 52' depending on the state of the various parts.

Certain novel functions of the magnetic tape apparatus according to the present invention, which can be performed using the sensors shown in FIGS. 2 and 3, will be described below.

(1) When the magazine 6 is set in the automatic loading mechanism 2, the cartridge 20 tends to jump out of or drop off a normal position in the magazine 6. Such jumping or dropping of the cartridge 20 is detected by the optical sensor 24. This function has been described above, and will not be described in detail below.

(2) The cartridge sensor 40 (see FIG. 3) detects whether the cartridge 20 is inserted erroneously in the magazine 6 when the accessor 8 effects an initializing operation. In initializing operation of the accessor 8, the accessor 8 moves to scan the array of cartridges stored in the magazine 6 when the magnetic tape apparatus starts to operate.

(3) The cartridge sensor 38 (see FIG. 3) detects whether the cartridge 20 is in the magazine 6 or not in the initializing operation of the accessor 8. The cartridge sensor 38 also serves to determine a cartridge stored in the magazine 6 is an ordinary cartridge or a cleaning cartridge.

The functions (2) and (3) will be described in detail below.

Figure 15:
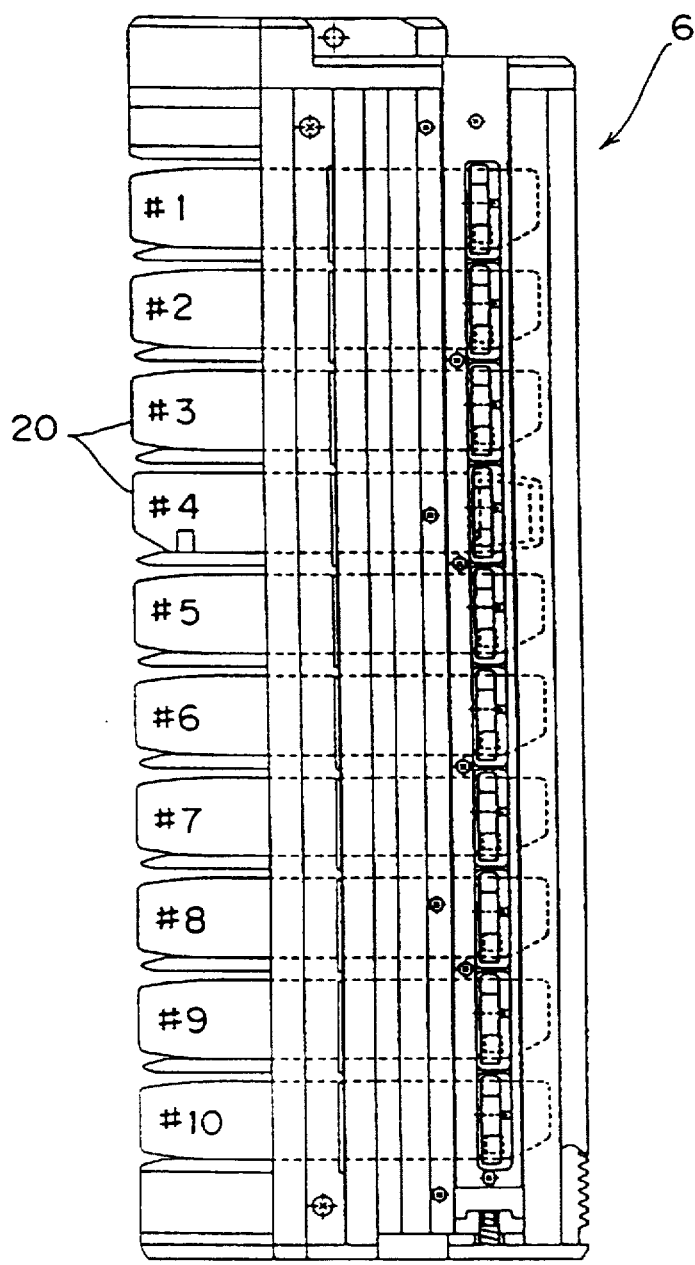
FIG. 15 is a side elevational view of a magazine in which one of cartridges is inserted erroneously.

FIG. 15 shows in side elevation the magazine 6 in which one of the cartridges is inserted in error. In the illustrated embodiment, a cartridge 20 is inserted in error, i.e., in an inverse direction, in the bin #4 of the magazine 6, and cartridges 20 are inserted normally in the other bins.

Figure 16A:
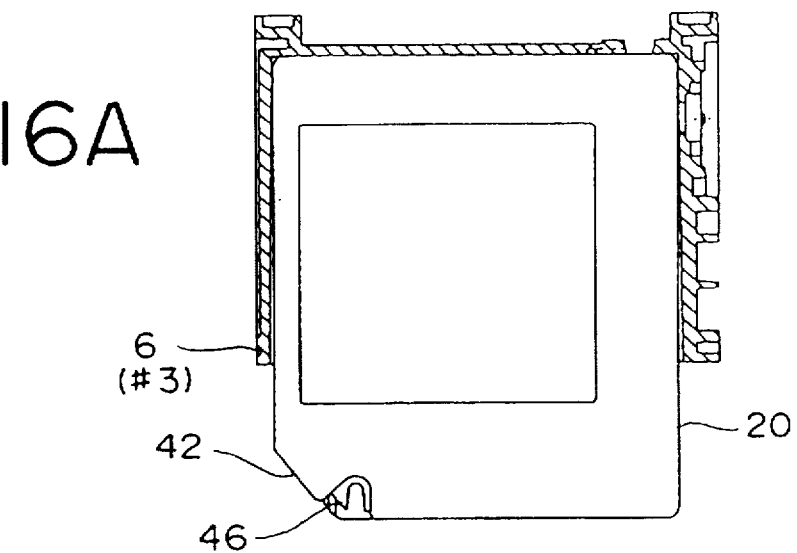
FIGS. 16A and 16B are plan views of cartridges which are inserted normally and inversely, respectively.
Figure 16B:
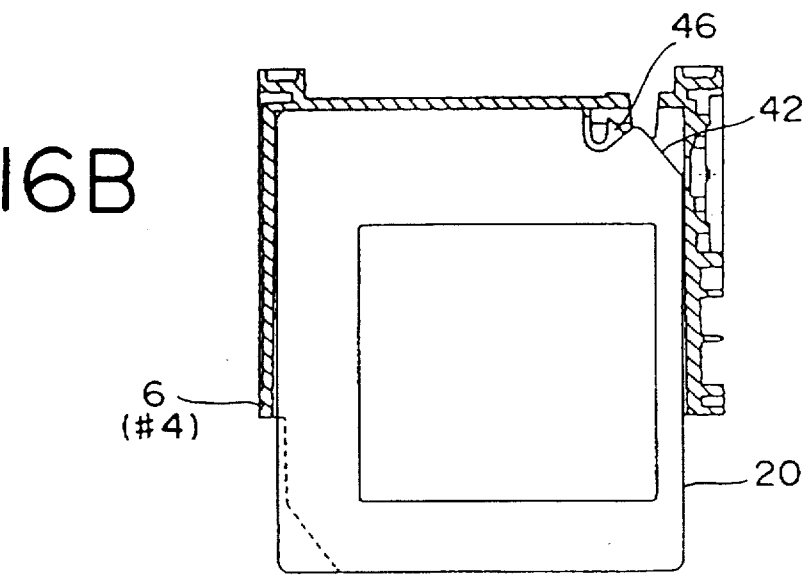

Normally and inversely inserted cartridges are shown respectively in FIGS. 16A and 16B. As shown in FIG. 16A, when the cartridge 20 is normally inserted in the bin #3, the recess 42 (see FIG. 4) for the leader block 46 is positioned back in the right-hand side as seen from the front of the apparatus (upper side in FIG. 16A). As shown in FIG. 16B, when the cartridge 20 is stored in the bin #4, the recess 42 is positioned in the front of the right-hand side as seen from the front of the apparatus.

Figure 17:
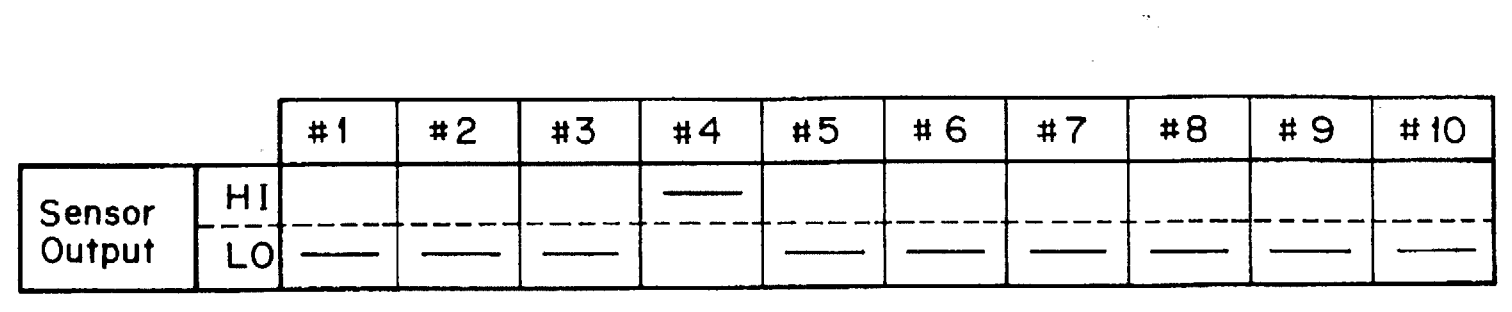

FIG. 17 illustrates detected output signals from the cartridge sensor 40. If the cartridge sensor 40 comprises a reflective cartridge sensor, then the cartridge sensor 40 produces a detected output signal "LO" when the cartridge 20 is inserted in the bin with recess 42 in the normal position as shown in FIG. 16A, and produces a detected output signal "HI" when the cartridge 20 is inserted in the bin with recess 42 not in the normal position as shown in FIG. 16B. The cartridge sensor 40 produces a succession of detected output signals when the accessor 8 scans the bins #1 through #10 of the magazine 6 in its initializing operation. Since the cartridge sensor 40 usually responds highly quickly in this embodiment, it can detect any erroneous insertion of a cartridge without mechanical contact even when the accessor 8 effects the initializing operation at high speed.

Figure 18:
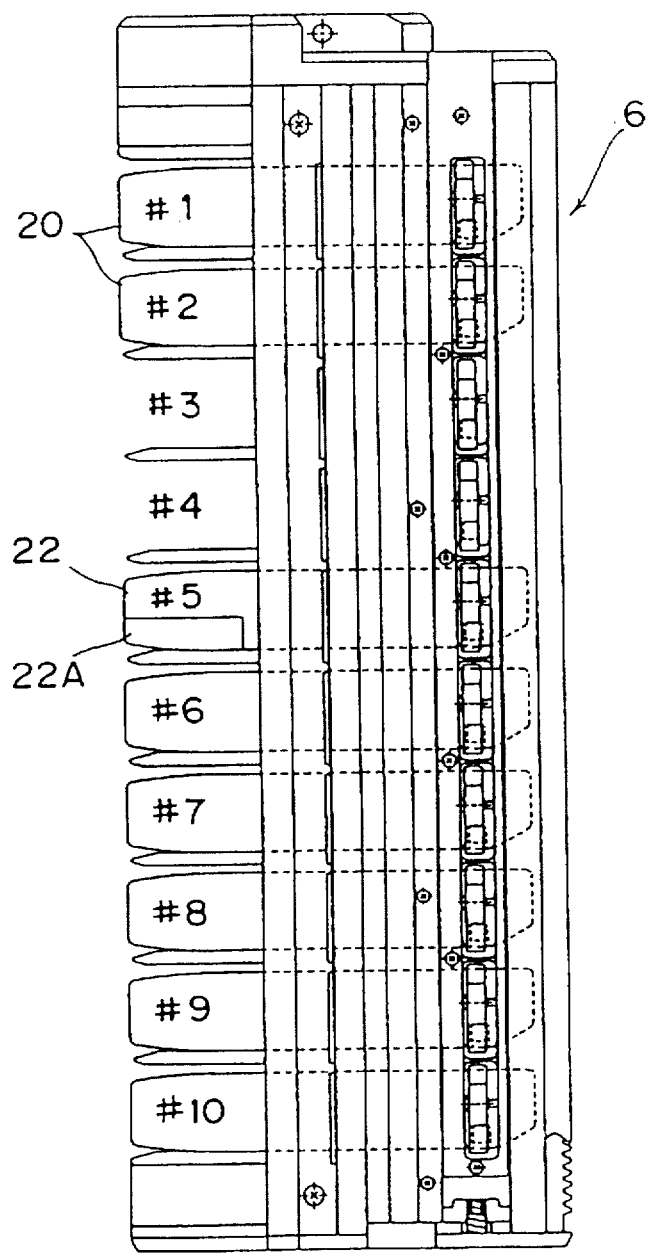
FIG. 18 is a side elevational view of the magazine in which a cleaning cartridge is inserted.

FIG. 18 shows in side elevation the magazine 6 with a cleaning cartridge inserted. In FIG. 18, ordinary cartridges 20 are normally inserted in the bins #1, #2, #6–#10 of the magazine 6, no cartridges in the bins #3, #4, and a cleaning cartridge 22 is normally inserted in the bin #5. The recess 22A of each of the normally inserted cartridges 22 is positioned in substantially lower half of the back of the left-hand side as seen from the front of the apparatus (right-hand side in FIG. 18). Therefore, when the accessor 8 effects the initializing operation, it can be determined whether there is a cartridge in each bin and also whether a cartridge is an ordinary cartridge or a cleaning cartridge, based on detected output signals from the cartridge sensor 38 (see FIG. 3) which represent the upper and lower halves of each cartridge.

Figure 19:
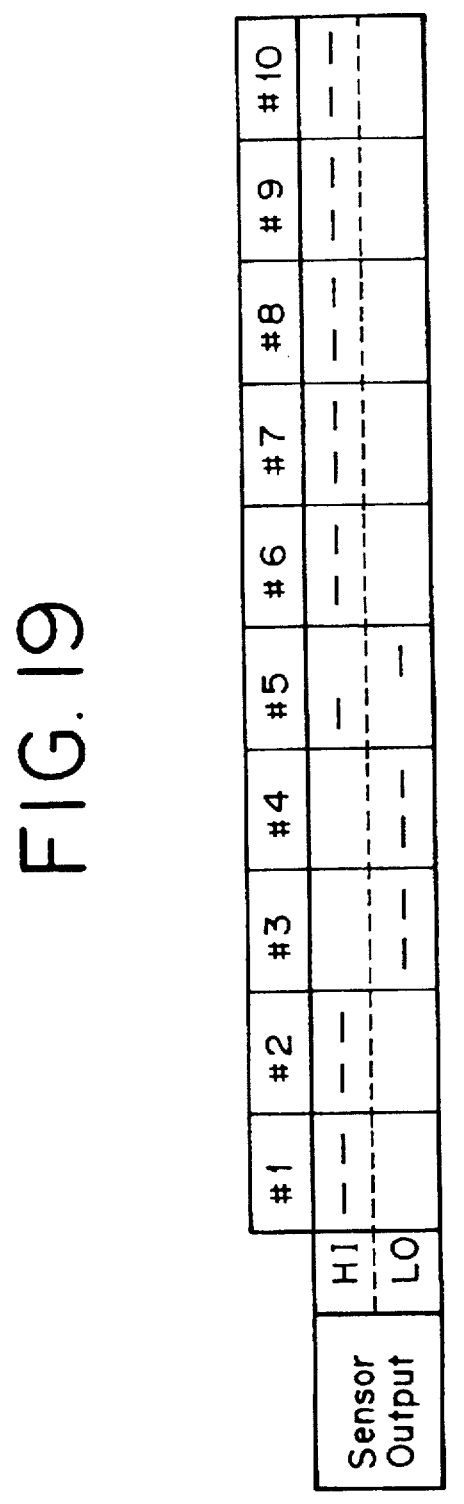

FIG. 19 illustrates detected output signals from the cartridge sensor 38. In each of the bins #1, #2, #6–#10, the cartridge sensor 38 produces a detected output signal "HI" representing the upper and lower cartridge halves, indicating that an ordinary cartridge 20 is stored. In each of the bins #3, #4, the cartridge sensor 38 produces a detected output signal "LO" representing the upper and lower cartridge halves, indicating that no cartridge is stored. In the bin #5, the cartridge sensor 38 produces a detected output signal "HI" representing the upper cartridge half, and a detected output signal "LO" representing the lower cartridge half, indicating that a cleaning cartridge 22 is stored. Consequently, when the cartridge sensor 38 thus operates in the initializing operation of the accessor 8, it can easily be determined, without mechanical contact, whether there is a cartridge in each bin and also whether a cartridge is an ordinary cartridge or a cleaning cartridge.

Figure 20:
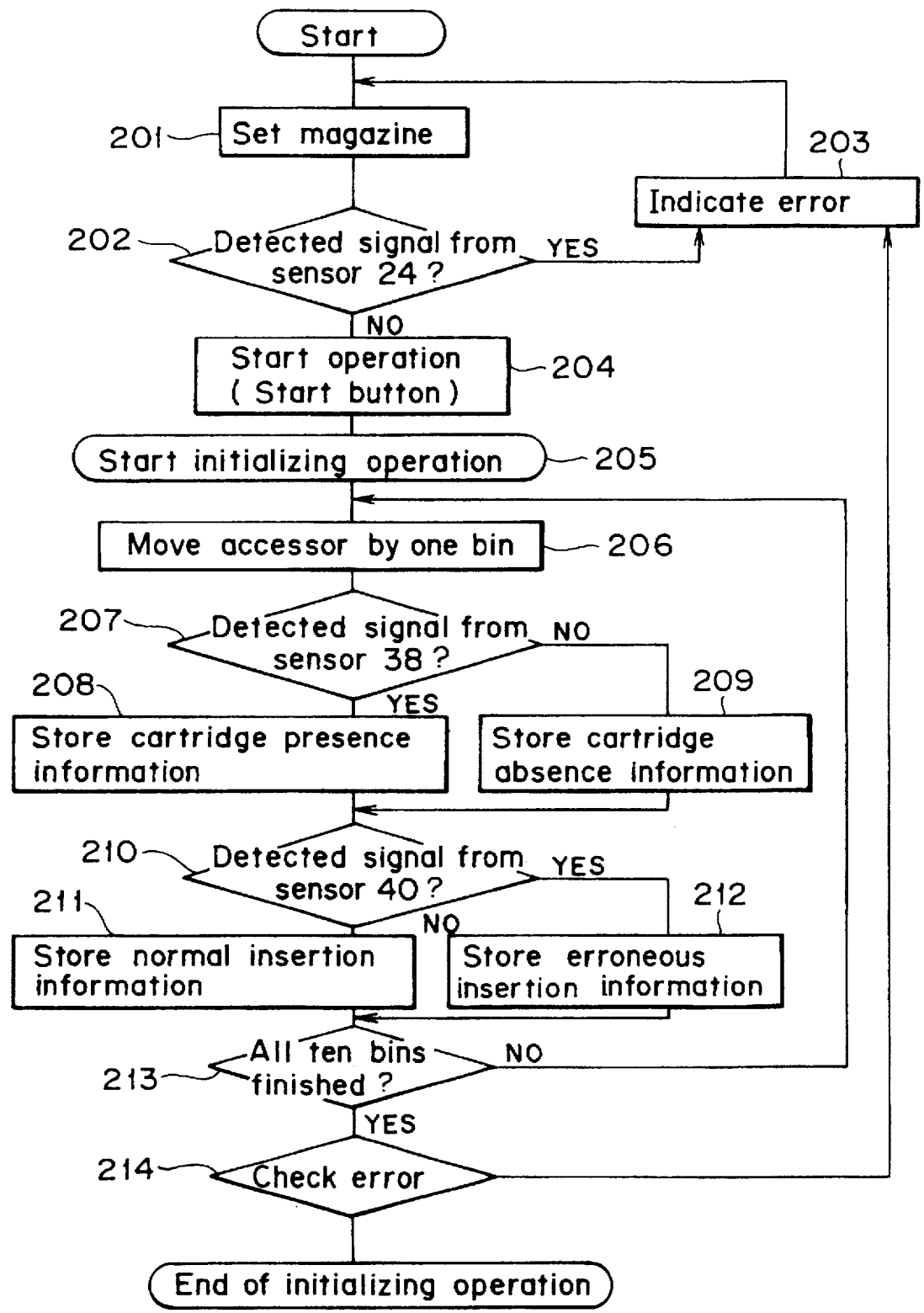
FIG. 20 is a flowchart of an operation sequence of the magnetic tape apparatus based on output signals from sensors.

FIG. 20 shows an operation sequence of the magnetic tape apparatus based on output signals from the sensors. After the magazine 6 is set in place in a step 201, a step 202 determines whether there is a detected output signal from the sensor 24. If there is a detected output signal from the sensor 24, then it is determined that a cartridge jumps out of or drops off the magazine 6, and an error is indicated in a step 203, after which control returns to the step 201. If there is no detected output signal from the sensor 24 in the step 202, then an apparatus operation is started upon depression of a start button in a step 204. Then, the initializing operation begins in a step 205.

In a step 206, the accessor 8 moves an interval corresponding to one bin of the magazine 6. Thereafter, a step 207 determines whether there is a detected output signal from the cartridge sensor 38. If there is a detected output signal from the cartridge sensor 38, then control goes to a step 208 in which information indicating that a cartridge is in the corresponding bin is stored in a memory. If there is no detected output signal from the cartridge sensor 38 in the step 207, then control goes to a step 209 in which information indicating that no cartridge is in the corresponding bin is stored in a memory. After the step 208 or 209, a step 210 determines whether there is a detected output signal from the cartridge sensor 40. If there is no detected output signal from the cartridge sensor 40, then control goes to a step 211 in which information indicating that a cartridge is normally inserted in the corresponding bin is stored in a memory. If there is a detected output signal from the cartridge sensor 40 in the step 210, then control goes to a step 212 in which information indicating that a cartridge is erroneously inserted in the corresponding bin is stored in a memory.

The step 211 or 212 is followed by a step 213 which determines whether the steps 206 through 212 have been executed in as many cycles as the number (10 in this embodiment) of bins of the magazine 6. If not, then control goes back to the step 206. If the steps 206 through 212 have been executed in as many cycles as the number of bins, then a final error check is carried out in a step 214. If there is an error, then control jumps to the step 203. If there is no error, the operation sequence or routine shown in FIG. 20 is finished. While no operation sequence for determining a cartridge type has been illustrated in FIG. 20, such an operation sequence may be carried out concurrent with the steps 207 through 209 based on the detected output signal from the cartridge sensor 38.

Figure 21:
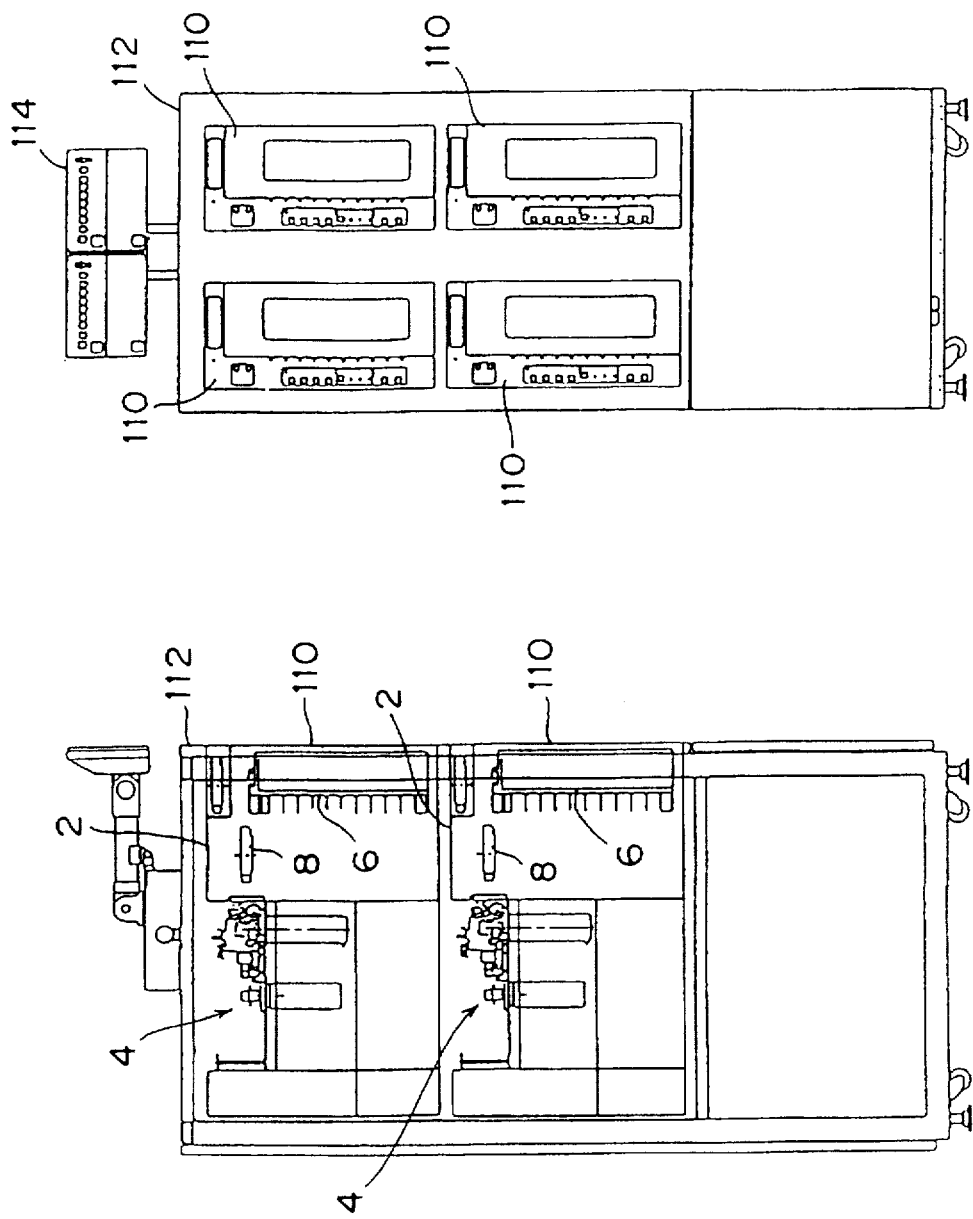
FIGS. 21A and 21B are side and front elevational views, respectively, of a system which incorporates a plurality of magnetic tape apparatus.

FIGS. 21A and 21B show a system incorporating a plurality of magnetic tape apparatuses. As shown in FIGS. 21A and 21B, four magnetic tape apparatuses 110 are mounted in two arrays in a frame 112, and a display panel 114 is mounted on an upper end of the frame 112. The system with a plurality of magnetic tape apparatuses can easily perform the Dynamic Device Reconfiguration (DDR) process. For example, the DDR process is carried out as follows:

If an error occurs in the recording/reproducing unit 4 of any of the magnetic tape apparatuses 110, then a cartridge being processed is returned from the recording/reproducing unit 4 to the magazine 6 of the magnetic tape apparatus 110 in question. Then, a message is displayed on the display panel 114, prompting the operator to continue or end the process which has been effected with respect to the cartridge. If the process is to be continued, then the operator operates a control panel to discharge the cartridge from the auxiliary entry/exit mechanism and set the discharged cartridge in the auxiliary entry/exit mechanism of another magnetic tape apparatus. The DDR process can thus be effected with ease in the system.

Figure 22:
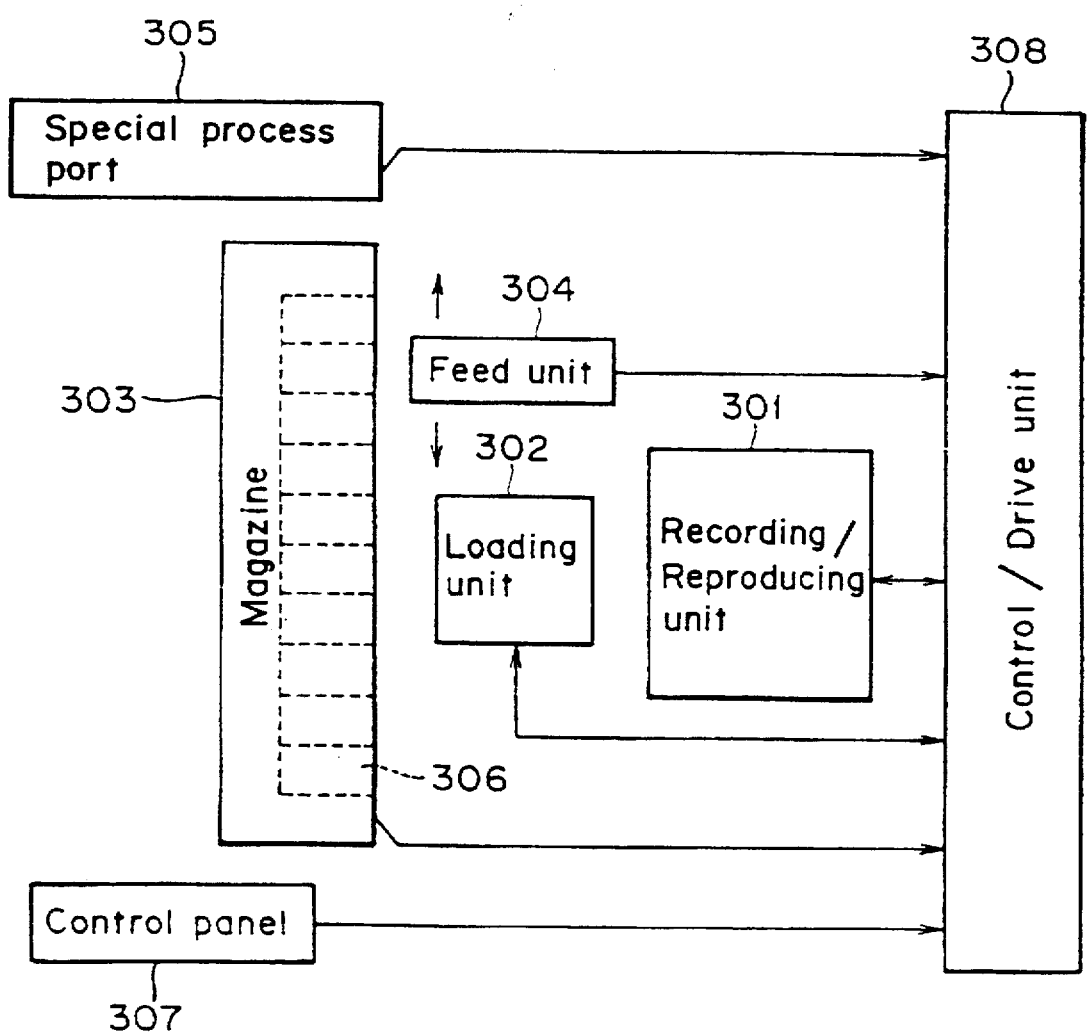
FIG. 22 is a block diagram showing a basic structure of another magnetic tape apparatus according to the present invention.
Figure 23:
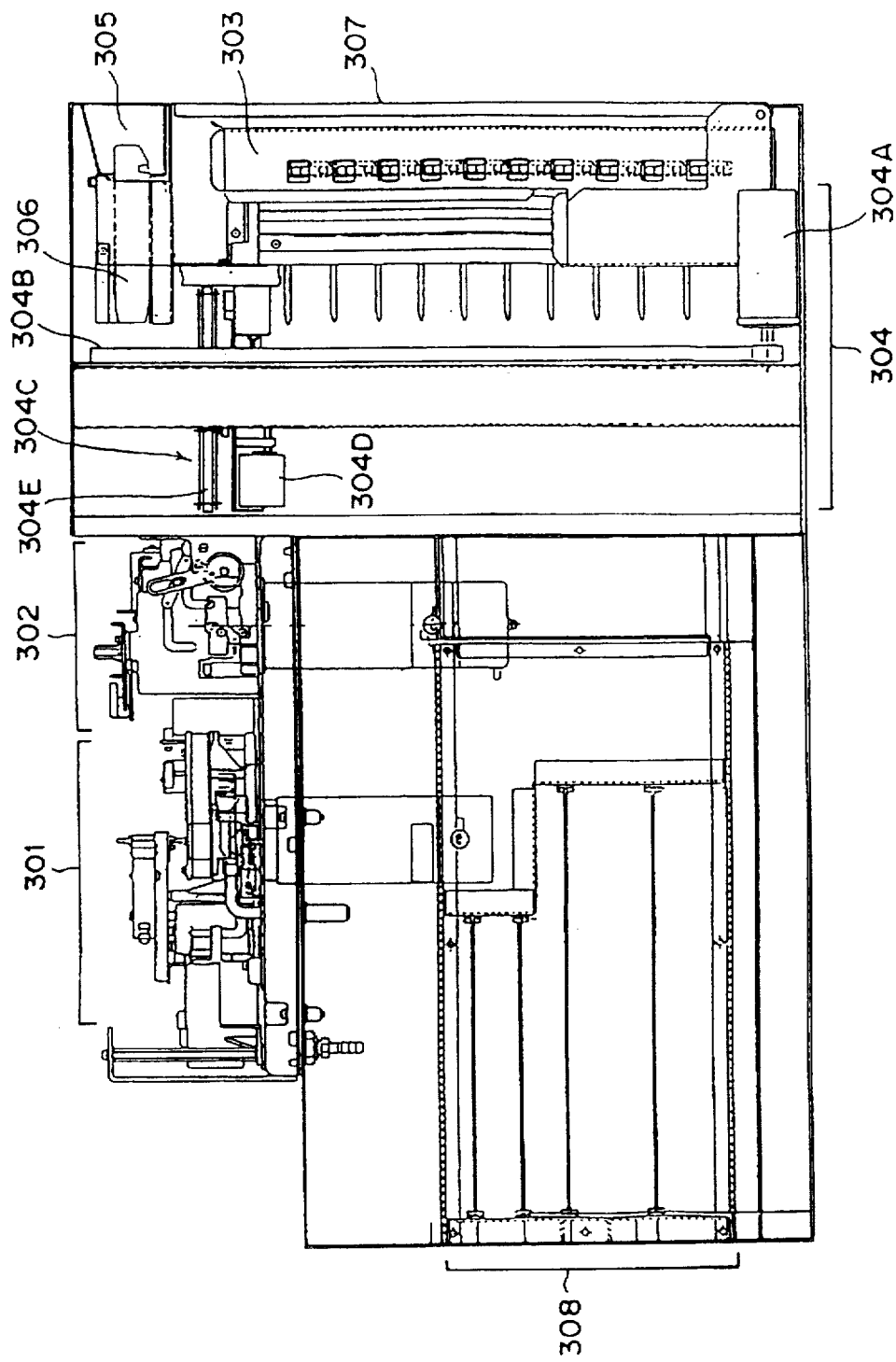
FIG. 23 is a side elevational view of the magnetic tape apparatus shown in FIG. 22.

FIG. 22 shows in block form another magnetic tape apparatus according to the present invention, and FIG. 23 shows the apparatus shown in FIG. 22 in side elevation. The magnetic tape apparatus comprises a recording/reproducing unit 301, a loading unit 302, a magazine 303, a feed unit 304, a special process port 305, a recording medium 306, a control panel 307, and a control/drive unit 308. The feed unit 304 comprises a vertical moving motor 304A, a vertical moving belt 304B, a feed machine 304C, a motor 304D for moving the recording medium, and a belt 304E for moving the recording medium. The magnetic tape apparatus shown in FIGS. 22 and 23 allows special processes such as an interrupting process to be carried out easily, as with the above embodiments.

With the present invention, as described above, the magnetic tape apparatus is capable of easily carrying out special processes such as an interrupting process.

Although certain preferred embodiments of the present invention have been shown and described in detail, it should be understood that various changes and modifications may be made therein without departing from the scope of the appended claims.

What is claimed is:

1. A magnetic tape apparatus comprising:

a recording/reproducing unit for recording data on and reproducing data from a cartridge-type recording medium; and an automatic loading mechanism, disposed in front of said recording/reproducing unit, for automatically loading a cartridge-type recording medium, said automatic loading mechanism including:

a magazine detachably disposed within said automatic loading mechanism and having an array of bins for storing cartridge-type recording mediums, said magazine being configured for entry and removal of cartridge-type recording mediums into and from said automatic loading mechanism;

an accessor movable along said array of bins between said recording/reproducing unit and said magazine for transferring a cartridge-type recording medium between said recording/reproducing unit and said magazine, said accessor having a feeder mechanism for feeding a cartridge-type recording medium along a line perpendicular to said array of bins;

an auxiliary entry/exit mechanism disposed within said automatic loading mechanism for entering and discharging a cartridge-type recording medium;

positioning means for positioning a cartridge-type recording medium entered into said auxiliary entry/exit mechanism in a first position in which said entered cartridge-type recording medium can be received by said accessor and for positioning a cartridge-type recording medium returned to said auxiliary entry/exit mechanism by said accessor in a second position in which said returned cartridge-type recording medium can be picked up by an operator, said positioning means including:

a stopper for stopping said entered cartridge-type recording medium in said first position;

a first sensor for detecting when said entered cartridge-type recording medium has arrived at said first position where said feeder mechanism can feed said entered cartridge-type recording medium into said accessor;

means for moving said stopper to a position which enables said feeder mechanism to feed said entered cartridge-type recording medium into said accessor, in accordance with a detection from said first sensor; and a second sensor for detecting when a cartridge-type recording medium has been fed to said second position; and said accessor being configured for directly transferring a cartridge-type recording medium among said auxiliary entry/exit mechanism, said recording/reproducing unit, and said magazine.

2. A magnetic tape apparatus according to claim 1, wherein said accessor comprises means for transferring a cartridge-type recording medium between said auxiliary entry/exit mechanism and said magazine; and wherein a cartridge-type recording medium other than a cartridge-type recording medium stored in said magazine may be transferred between said auxiliary entry/exit mechanism and said recording/reproducing unit independent of the position of said detachably disposed magazine via an interrupting process.

3. A magnetic tape apparatus according to claim 1, wherein each of said first and second sensors comprises a reflective optical sensor.

4. A magnetic tape apparatus according to claim 1, wherein said auxiliary entry/exit mechanism comprises:

an openable and closable door;

a lock mechanism for locking said door in a closed condition; and wherein said door is controlled based on detected output signals from said first and second sensors.

5. A magnetic tape apparatus according to claim 4, further comprising a single motor for actuating said stopper and said lock mechanism.

6. A magnetic tape apparatus according to claim 1, wherein said accessor is movable vertically, and comprises:

said feeder mechanism, which includes first and second feeder s for contacting opposite sides of a cartridge-type recording medium to feed the cartridge-type recording medium horizontally; and means for openably closing said first and second feeders to sandwich a cartridge-type recording medium therebetween.

7. A magnetic tape apparatus according to claim 6, wherein said automatic loading mechanism is configured and arranged to load a cartridge-type recording medium of a type which comprises:

a cartridge case substantially in the form of a rectangular parallelepiped having a recess defined in one of four corners thereof;

a magnetic tape wound and stored in said cartridge case; and a leader block attached to one end of said magnetic tape and seated in said recess when said magnetic tape is wound in said cartridge case; and wherein said automatic loading mechanism further comprises means for detecting an erroneous insertion of the cartridge-type recording medium based on whether said recess is in a predetermined position within said magazine or not.

8. A magnetic tape apparatus according to claim 6, further comprising detecting means for detecting a condition in which a cartridge-type recording medium projects toward said accessor rather than being normally stored in said magazine.

9. A magnetic tape apparatus according to claim 8, wherein said detecting means comprises:

means for emitting a light beam in a longitudinal direction of said magazine;

means for reflecting said light beam; and means for detecting the reflected light beam.

10. A magnetic tape apparatus according to claim 6, further comprising detecting means mounted on said accessor for detecting whether there is a cartridge-type recording medium in said magazine as said accessor moves along said array of bins.

11. A magnetic tape apparatus according to claim 10, wherein said detecting means comprises means for identifying a cleaning cartridge having a recess defined in a portion thereof which is predetermined in the direction in which said accessor is movable.

12. An information storage apparatus comprising:

a magazine having a plurality of bins, each bin for storing a cartridge medium, each cartridge medium for storing information, said plurality of bins being arranged along a line;

a magazine table for detachably mounting said magazine to said information storage apparatus and for permitting cartridge medium access to said information storage apparatus;

an information accessing unit for accessing the information stored in the cartridge medium;

a cartridge insertion port arranged along said line, said cartridge insertion port for providing an auxiliary entry/exit means for a cartridge medium and being capable of storing a single cartridge medium;

an accessor disposed between said magazine and said information accessing unit, said accessor being movable along said line for directly transferring a cartridge medium among the bins of said magazine, said information accessing unit, and said cartridge insertion port; and positioning means for positioning a cartridge medium entered into said cartridge insertion port in a first position in which said entered cartridge medium can be received by said accessor and for positioning a cartridge medium returned to said cartridge insertion port by said accessor in a second position in which said returned cartridge medium can be picked up by an operator, said positioning means including:

a stopper for stopping said entered cartridge medium in the first position;

a first sensor for detecting when said entered cartridge medium can be received by said accessor;

means for moving said stopper to a position which enables said entered cartridge to enter said accessor in accordance with a detection from said first sensor; and a second sensor for detecting when a cartridge is positioned in the second position.

13. An information storage apparatus comprising:

a magazine having a plurality of bins, each bin for storing a cartridge medium, each cartridge medium for storing information, said plurality of bins being arranged along a line;

a magazine table for detachably mounting said magazine to said information storage apparatus and for permitting a cartridge medium access to said information storage apparatus;

an information accessing unit for accessing the information stored in a cartridge medium;

a cartridge insertion port arranged along said line, said cartridge insertion port providing an auxiliary entry/ exit for a cartridge medium and being capable of storing a single cartridge medium;

an accessor disposed between said magazine and said information accessing unit, said accessor being movable along said line for directly transferring a cartridge medium among the bins of said magazine, said information accessing unit, and said cartridge insertion port, said accessor having a feeder mechanism for feeding a cartridge medium along a line perpendicular to said line of said plurality of bins; and positioning means for positioning a cartridge medium entered into said cartridge insertion port in a first position in which said entered cartridge medium can be received by said accessor and for positioning a cartridge medium returned to said cartridge insertion port by said accessor in a second position in which said returned cartridge medium can be picked up by an operator, said positioning means including:

a stopper for stopping said entered cartridge medium in the first position;

a first sensor for detecting when said entered cartridge medium has arrived at at the first position where said feeder mechanism can feed said entered cartridge medium into said accessor;

means for moving said stopper to a position which enables said feeder mechanism to feed said entered cartridge medium into said accessor, in accordance with a detection from said first sensor; and a second sensor for detecting when a cartridge medium has been fed to the second position.

14. An information storage apparatus according to claim 13, wherein each of said first and second sensors comprises a reflective optical sensor.

15. An information storage apparatus according to claim 13, further comprising:

an auxiliary entry/exit mechanism for entering and discharging a cartridge medium other than a cartridge medium stored in said magazine;

control means which enables an interrupting process, which permits a cartridge medium other than a cartridge medium stored in said magazine to be transferred between said auxiliary entry/exit mechanism and said information accessing unit independent of the position of said magazine table; and wherein said accessor comprises means for transferring a cartridge medium between said auxiliary entry/exit mechanism and said magazine.

16. An information storage apparatus according to claim 15, wherein said auxiliary entry/exit mechanism comprises:

an openable and closable door;

a lock mechanism for locking said door in a closed condition; and wherein said door is controlled based on detected output signals from said first and second sensors.

17. An information storage apparatus according to claim 16, further comprising a single motor for actuating said stopper and said lock mechanism.

18. An information storage apparatus according to claim 13, wherein said accessor is movable vertically, and comprises said feeder mechanism, which includes first and second feeders for contacting opposite sides of a cartridge medium to feed the cartridge medium horizontally; and means for openably closing said first and second feeders to sandwich a cartridge medium therebetween.

19. An information storage apparatus according to claim 18, wherein said magazine is configured and arranged to store a cartridge medium of a type which comprises:

a cartridge case substantially in the form of a rectangular parallelepiped having a recess defined in one of four corners thereof;

a magnetic tape wound and stored in said cartridge case; and a leader block attached to one end of said magnetic tape and seated in said recess when the magnetic tape is wound in said cartridge case; and wherein said information storage apparatus further comprises means for detecting an erroneous insertion of the cartridge medium based on whether said recess is in a predetermined position within said magazine or not.

20. An information storage apparatus according to claim 18, further comprising detecting means for detecting a condition in which a cartridge medium projects toward said accessor rather than being normally stored in said magazine.

21. An information storage apparatus according to claim 20, wherein said detecting means comprises:

means for emitting a light beam in a longitudinal direction of said magazine;

means for reflecting said light beam; and means for detecting the reflected light beam.

22. An information storage apparatus according to claim 18, further comprising detecting means mounted on said accessor for detecting whether there is a cartridge medium in said magazine as said accessor moves along said line of bins.

23. An information storage apparatus according to claim 22, wherein said detecting means comprises means for identifying a cleaning cartridge having a recess defined in a portion thereof which is determined in the direction in which said accessor is movable.

* * * * *